US009460123B1

(12) United States Patent
Strutt

(10) Patent No.: US 9,460,123 B1
(45) Date of Patent: Oct. 4, 2016

(54) SYSTEMS AND METHODS FOR GENERATING AN ARRANGEMENT OF IMAGES BASED ON IMAGE ANALYSIS

(71) Applicant: Amazon Technologies, Inc., Reno, NV (US)

(72) Inventor: Guenael Thomas Strutt, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/712,562

(22) Filed: Dec. 12, 2012

(51) Int. Cl.
*G06F 17/30* (2006.01)

(52) U.S. Cl.
CPC .......... *G06F 17/3028* (2013.01); *G06F 17/30* (2013.01)

(58) Field of Classification Search
CPC .......... G06T 2207/10016; G06T 2207/10024; G06T 2207/30242; G06T 2207/10028; G06T 2207/30176; G06T 7/408; G06T 7/0022; G06T 7/0065; G06T 1/00; G06K 9/46; G06K 9/4652; G06K 9/0063; G06K 9/00221; G06K 9/00456; G06K 9/6212; G06K 9/00013; G06K 9/36; G06K 9/78; G06K 9/623; G06F 17/30247; G06F 17/30256; G06F 17/3025; G06F 17/30259; G06F 17/30244; G06F 17/30802; G06F 17/50; G06F 17/30038; G06F 17/30047; G06F 17/30041; G06F 17/30262; G06F 17/30595; G06F 17/30044; G06F 17/30817; G06F 17/30598; G06F 17/2211; G06F 3/0425; G06F 3/1415; G06F 3/04845; G06F 3/0484; G06F 3/1242
USPC ....... 303/305, 165, 181, 162, 274, 164, 260, 303/166; 707/999.107, E17.02, E17.028, 707/915, 913, 918
See application file for complete search history.

(56) References Cited

U.S. PATENT DOCUMENTS

| 2003/0021481 | A1* | 1/2003 | Kasutani ........... G06F 17/30271 382/218 |
| 2003/0198390 | A1* | 10/2003 | Loui et al. ................... 382/224 |
| 2012/0076427 | A1* | 3/2012 | Hibino et al. ................ 382/218 |
| 2012/0294514 | A1* | 11/2012 | Saunders et al. ............. 382/159 |
| 2013/0086063 | A1* | 4/2013 | Chen et al. ................... 707/736 |
| 2013/0301915 | A1* | 11/2013 | Terrazas et al. .............. 382/173 |

* cited by examiner

*Primary Examiner* — Robert Beausoliel, Jr.
*Assistant Examiner* — Pedro J Santos
(74) *Attorney, Agent, or Firm* — Sutherland Asbill & Brennan LLP

(57) ABSTRACT

This disclosure relates to systems and methods for generating a narrative of images based on image classification, selection, and arrangement based, at least in part, on time, location, content, color, complexity, and/or faces. The image classification may be based on image analysis or analyzing information attached to the images.

28 Claims, 12 Drawing Sheets

SYSTEMS AND METHODS FOR GENERATING AN ARRANGEMENT OF IMAGES BASED ON IMAGE ANALYSIS

BACKGROUND

Photography is creative art form that leverages artistic concepts to capture images of an artistic or personal nature. The ubiquity of image capture devices and social media distribution networks has generated a large amount of content that may be viewed by a wider audience than in the recent past. However, the viewing experience may be poor when the same or similar images are shown or that the images lack a theme or concept that ties the pictures together. As a result, viewers may stop viewing or not view the images after being overwhelmed by the similarity and amount of images or by a confusing arrangement of the images.

Figure 1:
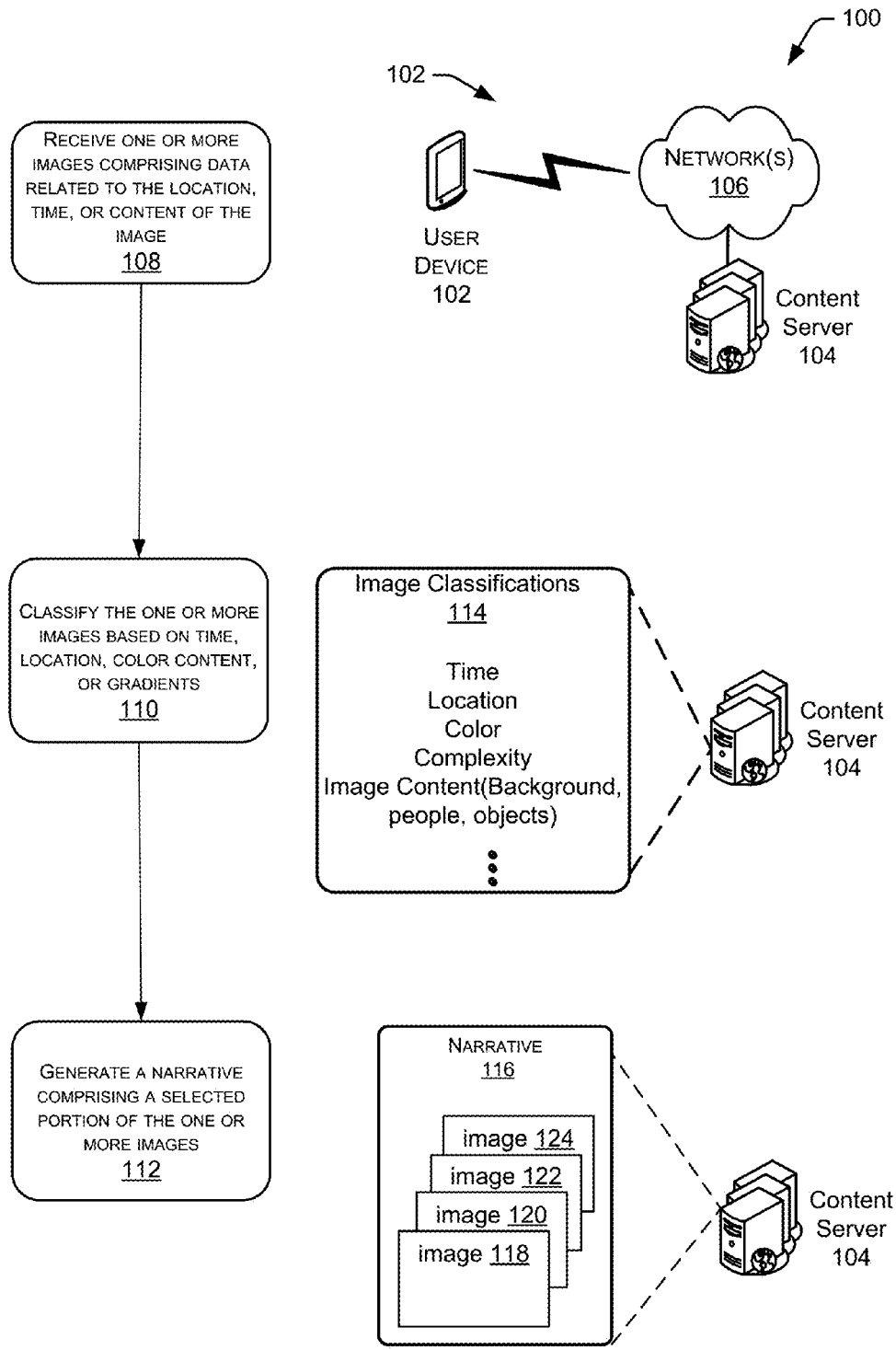
FIG. 1 illustrates a flow diagram for a method arranging images into a narrative in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for generating a narrative of images that may include images selected based, at least in part, on image classifications made by a content server. The image classifications may include, but are not limited to, a time of image capture, a location of image capture, color content in the image, complexity of the image, and/or content captured in the image. The narrative may impart an organization to the images based on the image classifications and may include different types of pictures to maintain a viewer's interest. The differences between the images may be based, at least in part, image classification scheme.

In one embodiment, the image classification scheme may include organizing the images in to a histogram to organize the images based on classification characteristics to track how frequent that classification characteristic is found in the images. For example, the images may be organized into a location histogram that may include bins for different locations associated with the images. The bins may include specific or generic locations based on meta-data information assigned to the image or based on image analysis (e.g., famous monument, home, etc.). The images are assigned to the nearest matching bin and the histogram records the quantity in each bin or the frequency for each bin. Broadly, the narrative generation may determine a location component for the narrative when the location histogram indicates a pattern or focus that may indicate interest in a particular location or locations. In conjunction with other image classification histograms (e.g., time, content, color, etc.), the user device may generate a narrative that may be a cohesive and interesting to a viewer. For example, the narrative images may alternate between images from different image classification components (e.g., time, content, color, etc.) or from a different bin (e.g., first location, second location) within the same image classification component.

In one embodiment, the narrative may include a first image that is representative of the image classification histograms. Images that follow the first image, may illustrate story based, at least in part, on the pattern highlighted by the histogram bins. Although this may include selecting photos from high frequency bins, the narrative may alternate between different image classification histograms or bins to maintain diversity. The diversity may prevent duplicate photos or similarly looking photos from being shown in the narrative. The diversity may also allow for images with a different look or feel to be placed near each other in the narrative to maintain viewer interest throughout the narrative. The narrative may also include a final image may be signify the end of the narrative. The final image may include a group photo of the people shown within the narrative or a location (e.g., airport, home) or content (e.g., taxi, bags, empty room) that may signify the end of a trip or an event shown in the narrative.

In one embodiment, the system may include an image capturing device that provides images to content server over a network. The content server may perform the image classifications and generate the image classification histograms. The content server may generate the narrative based, at least in part, on the image classification histograms. Additionally, the content server may add music or image backgrounds to the narrative to highlight one or more aspects of the narrative. For example, the narrative may include a sporting event, a party, or a vacation trip. Up tempo music may be associated with the sporting event or party images. Lower tempo music may be associated with scenic images of a vacation trip or a wedding procession (e.g., wedding party). The image backgrounds may also be consistent with the narrative theme. For example, a trip to a specific country or location may include background images that may be associated or identified with the country or location. For example, the background may incorporate an image based, at least in part, on a trip to a theme park. The background may highlight the theme park or allude to the type of activities that may performed at the theme park.

FIG. 1 illustrates a method 100 for generating a narrative from images captured by a user device 102 and sent to a content server 104 over a network 106. The narrative may be generated based on the image classifications associated with the images. The image classifications may be based on the information (e.g., meta-data) assigned to the image or the content within the image. FIG. 1 will describe the narrative generation method 100 at a high level and the additional figures will provide greater detail and additional embodiments of the narrative generation.

At block 108, the content server 104 may receive one or more images captured by the user device 102. The images may include information assigned to them by the user device 102 that may provide an indication of where, when, or what the image captured.

In one embodiment, this may include meta-data information that indicates a time and/or date the image was captured. This may be referred to as a time stamp in certain embodiments. The meta-data information may also include a location of where the image was captured. The user device 102 may include a location detection capability so that the location information may be automatically assigned to the image. However, the user device 102 may also enable a user to enter the location information or any meta-data information for one or more of the captured images. In certain instances, the meta-data information may also include content information that may identify the content in the image. This may include, but is not limited to, the identities of people, places, or things captured within the image.

At block 110, the content server 104 may classify the one or more images based, at least in part, on image content or image information. The image classifications 114 may include, but are not limited to, time, location, color, gradients (e.g., complexity), and/or image content.

The time classification may be based on time and/or date of when the image was captured. This may include the time of day (e.g., hour, minute, second, etc.) along with the date or may include the time only or the date only. The time information may be used to determine when the picture was taken, as well as, a relative time of when the image was captured relative to other images captured by the device. For example, any indicium that distinguishes when an image was captured relative to another image may also be used in place of time/date. This may include assigning sequential numbering scheme that indicates which pictures were taken before or after other pictures and/or the time duration between the captured images.

The location classification may be based, at least in part, on the location of where the image was captured. The location information may be attached to the image by the user device 102. The location determination may be done by the user device 102 using any form of location detection or determination hardware, software, or combination thereof. Additionally, the location information may be assigned by a user (not shown) via a user interface (not shown) of the user device 102. The location information may include, but is not limited to, location coordinates, an address, or a user selected location reference. The location coordinates may include any form of map or positioning coordinates determined by a positioning system in the user device 102. In one specific example, the location coordinates may include latitude and longitude coordinates based on degrees, minutes, and seconds (e.g., N47° 35.51' 0", W122° 34.95', 0").

The color classification may include determining the type of colors or the mix of colors that are captured within the image. The colors that dominate the image may be assigned as the dominate color of the image. In certain instances, the color that is the majority color may be the assigned color. For example, when a color or a color combination is more than about 50% of the color in the image, the image may be classified as being that color or color combination. In another instance, when a color or color combination is not a majority, the color or color combination that covers the highest percentage of the image may designated as the color classification for that image. In certain instances, the image may be given two color classifications a primary color classification and a secondary color classification. The primary color classification may be based on the color with the highest percentage of coverage within the image. The secondary color classification may be based on the color with the second highest percentage of coverage within the image.

In another embodiment, the primary and secondary classifications may occur when the coverage of the two colors are within a predetermined threshold. For example, when the coverage of the colors is within about 5% of each other, the primary and secondary classifications may occur. In another instance, when the coverage of the two colors combined may be greater than a threshold amount, the primary and secondary color classifications may occur. For example, when the coverage of the two colors exceeds about 40%, 50%, or 75% of the image, the primary and secondary classifications may occur. In another instance, a combination of the primary and secondary criteria may also be used. This may include that the coverage of the two colors exceeds a threshold amount and that the coverage of the two colors are within threshold amount of each other. For example, when the two colors are determined to cover about 50% or more of the image and the individual coverage of each color is within about 10% of each other, the primary and secondary color classifications may be used.

In another embodiment, the amount of radiance or brightness of the colors relative to each other within an image may also determine the image color classification. For example, a certain color may cover a majority of the image. However, the majority coverage color may be subdued compared to other colors in the image. The color classification may also be determined on the radiance or brightness of the minority color. For example, lighting may determine that minority coverage colors are more clearly captured or pronounced within the image. The content server 104 may determine that brighter or more radiant minority coverage color may be a better choice for the image's color classification. This determination may be based on a threshold amount of difference in radiance between the majority coverage color and the minority coverage color.

The complexity classification may indicate the relative complexity of the image from a structural point of view. This may include ranking the image on the amount of change in contours within the image. The higher degree of change in contour within the image may indicate a higher degree of complexity within the image. In one embodiment, the complexity classification may be based, at least in part, on determining the amount of edges or the density of edges within the image. In one embodiment, a Canny edge detector technique may detect edges within an image. The edges may reflect a change in contour within the image. The edge detection may determine the sharpness of the edge which may be reflected in the size of the gradient that may be assigned to the edge. The gradient may be the result of a change in magnitude of an image characteristic between two different locations in the image. The characteristic may include colors or contours within the image. As the number and/or size of the gradients increase, the complexity classification of the image may also increase. For example, an image of a calm ocean may have a lower complexity than an image of the ocean with heavy surf conditions. The content server 104 may assign a complexity ranking or value to images based on their relative complexity to each other in view of the number or density of edge gradients.

The image content classification may be determined based on the type of content within the image. This may include one or more classification categories that may broadly start with content classification based on the type of objects within the image. This may include determining the types of objects within the image and/or the people within the image. The image content classification may assign one or more classifications to the image to identify several elements or people captured in the image. For example, the content classification may also determine the elements in the foreground of the image and/or the background of the image.

In one embodiment, the image content classification may include content classification groups. These groups may include, but are not limited to, objects, people, foreground objects, and/or background objects. These content classification groups may be derived based on the content of the images. The groups may be used to account for the relative complexity of the images and/or the amount of images to be classified. Due to the variety of content, the content server 104 may generate more than one image content classification. For example, the additional content classifications may be able to distinguish and classify between different images of similar objects from different perspectives (e.g., foreground, background) or combination of objects (e.g., objects posed with people or objects without people) or a combination thereof.

At block 112, the content server 104 may generate a narrative comprising a selected portion of the one or more classified images. The narrative may include one or more images 118, 120, 122, 124 that are selected from a larger group of images. The images may be selected for the representative nature of a timeline and/or subject matter that are captured in the images. The selection process may include determining which images are of a higher quality images. Quality may be determined by image clarity (e.g., image focus), brightness, object orientation (e.g., centered, tilt), object completeness (e.g., whether a portion of the object is extends outside the boundary of the image), object shadowing, and/or posing characteristics (e.g., people in the image are looking at the image capture device, smiling).

The content server 104 may select images that are not similar to each other or duplicates of each other. The diversity of images may be based, at least in part, on the degree of difference between the photos in view of the image classification rankings. The degree of difference may be based on the image classification determinations or rankings. In one embodiment, the selection may be choosing between complex images and less complex images that may be related to the similar content. For example, the different complexity images may include the same person posing in the images with different objects. Although both images include the same person, the difference in background complexity may indicate a high degree of difference between the images. Hence, the narrative may include some images that may include common elements but may be different in other ways that may warrant their selection for the narrative. However, when the image classification indicates the complexity and content are similar, the narrative is less likely to use both images and may just pick one image.

The arrangement of the images may be based, at least in part, on several image classifications that indicate the similarities or differences between the images. The content server 104 may determine whether the narrative may be based, at least in part, on time, location, color, complexity, content, and/or a combination thereof. The content server 104 may determine a primary theme for the narrative based on whether the images may be related to each other based on the image classifications. For example, the narrative may determine one set of photos may be related to vacation or an event based on the time and location classifications. The narrative may begin with a first image that is representative of the vacation or the event. The first image may include a group shot of the people at the event or on vacation. In another embodiment, the first image may be representative of the location of the event or vacation. This embodiment may be triggered when the images may include more inanimate objects or a significant amount of people that may not recognized than people that are recognized.

In one embodiment, the images may be arranged based on time. For example, images may be grouped together based on when the images were captured. The content sever 104 may determine whether the images are likely to be related to each other based on time. When the time relationship is identified, the narrative may select and arrange the images that may be representative of a timeline. For example, the timeline may be representative of dawn to dusk timeline, in which images are arranged based on the time of day to show a time elapse narrative that is representative of what happened throughout the day. In another embodiment, the narrative may be based on a group of pictures taken over a period of days. The content server 104 may determine the cluster of pictures exceed a threshold amount based on the previous history of images. This may be done by comparing the amount of pictures taken over time and compared to the picture rate of a cluster of images. When the threshold amount may be exceeded, the content server 104 may determine a narrative that may be event related (e.g., vacation, sporting event) that may be appropriate for a timeline influenced narrative. In one specific embodiment, a timeline narrative for a sporting event may include a first image of the team or individuals taking the field or of the scoreboard before or early in the game. The first image (e.g., image 118) provides a representative theme for the narrative, which is a sporting event. The intermediate images (e.g., images 120, 122) may include other images that may be arranged in sequential order based on their time stamp to show the progress of the sporting event. The final image (e.g., image 124) may be representative of the outcome or completion of the game (e.g., final scoreboard, players leaving the field).

The content server 104 may also determine an arrangement of images based on a combination of the image classification information. In certain instances, the content server 104 may generate more than one narrative from the received images. For example, the first narrative may be a timeline narrative that arranges the images based, at least in part, on the time the images were captured. The second narrative may be based, at least in part, on the location instead of time. The second narrative may be preferred when images are taken at the same location but at different times. However, the content server 104 may minimize the selection of duplicate or substantially similar images in the second narrative.

In another embodiment, the first narrative may also include selecting images based on the color and/or complexity of the images. Therefore, the timeline may be a primary theme of the narrative and may include secondary or tertiary themes based on other images classification information (e.g., color, complexity). The secondary color theme may include selecting images and/or arranging images based on differences or contrasts in color to provide diversity to the narrative. In one specific embodiment, the color theme arrangement may alternate between two or more color schemes to present a diverse narrative. In certain instances, this may involve superseding the timeline narrative (e.g., primary narrative) slightly to achieve a diverse narrative that may be more likely to maintain a viewer's interest.

The content server 104 may generate more than one narrative and present the narratives to a user for approval and/or editing. The user may alter or add to the narrative as needed. For example, the user may add music or background themes that frame the images in the narrative.

FIGS. 2-5 illustrate a flow diagram for a method 200 for classifying images across several characteristics and ranking or assigning the images to bins of a histogram. The image classifications may include, but are not limited to, time, location, content, color, complexity, and/or faces. The method 200 may be a single embodiment and other embodiments of the method 200 may be performed by omitting or rearranging the operations described.

A histogram may be a graphical representation of a distribution of data or information that indicate the relative frequencies of how much an event may occur relative to other events. In one instance, the histogram may include a frequency axis (e.g., y-axis) that displays the magnitude of the events that occur. The bin axis (e.g., x-axis) may include a plurality of bins that may represent a range of values or different items that may be of importance to an event. The image classifications 114 may be represented using a histogram to show a distribution for each image classification. The content server 104 may generate bin assignments or names and determine which bin an image may belong to for a particular image classification 114. The concept of histograms will be discussed below in greater detail in the descriptions of FIGS. 2-5.

Figure 2:
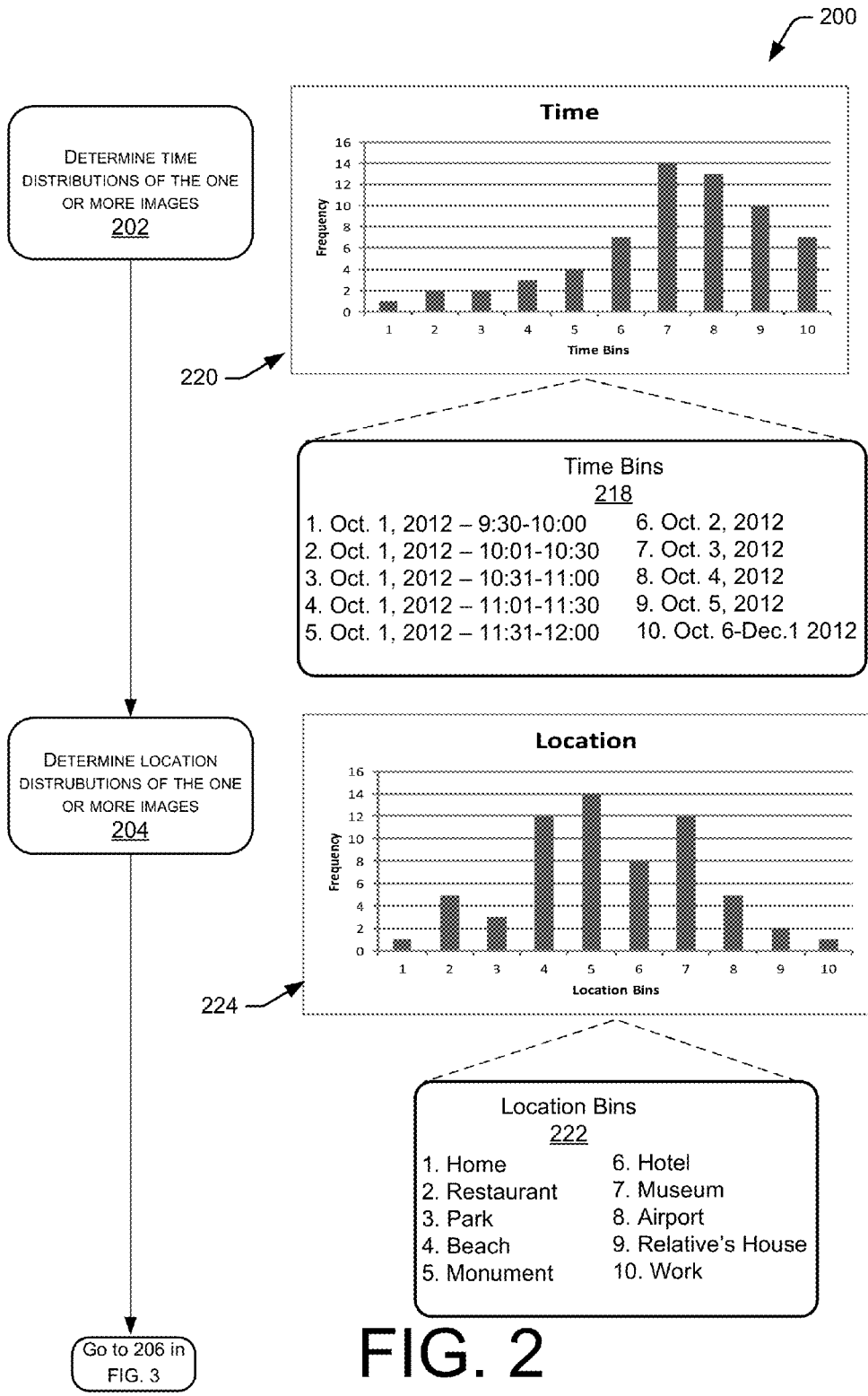
FIGS. 2-5 illustrate a flow diagram for a method of classifying images in accordance with one or more embodiments of the disclosure.

At block 202, the content server 104 may determine the time information for one or more of the images received from the user device 102. The content server 102 may generate time bins that 218 may represent a discrete period of time that may range from second, minutes, hours, or days based on the type of time information that may be associated with the images. In the illustrated embodiment, a cluster of images are captured on Oct. 1, 2012 between the time of 9:30 pm-12:00 am. The content server 104 may generate bins based on time range in which the distribution over time may be illustrated. In one specific embodiment, bins 1-5 are shown to include 30 minute intervals. Bins 6-9 show that the bins may also be used to represent an entire day and bin 10 illustrates how multiple days may be covered by a single bin. In general, the histogram may be used to show a continuous distribution over a period of time at similar intervals or by irregular intervals as shown in FIG. 2.

The content server 104 may generate a time histogram chart 220 to graphically represent the frequency of the images with respect to the time intervals in the bin axis (e.g., bins 1-10). The amount of images in each bin ranges from one to 14 as shown in the histogram chart 220. The histogram shows that bin 7 had the highest amount of images followed by bins 8-10, while bin 1 had the fewest images at one. The time histogram chart 220 shows that most of the images were captured between Oct. 3-5, 2012. The content server 104 may use that distribution information to determine a narrative for that time frame. The narrative determination may also be based in conjunction with other histogram distributions of other image classifications 114 and any other meta-data (e.g., photographer comments) associated with the images.

At block 204, the content server 104 may determine location information for one or more of the images received from the user device 102. The location information may be based on location information attached to the image or by analyzing the image for potential location information (e.g., famous monument or artwork). The content server 104 may generate location bins based on the locations associated with the images. In the illustrated embodiment, the location bins 222 may include home, restaurant, park, beach, monument, hotel, museum, airport, relative's house, or work. The location histogram 224 shows that the amount of images range from one to 14 and that bins 5 and 7 show the highest amount of images associated with individual locations.

The content server 104 may identify a vacation narrative based on the airport and hotel images along with locations (e.g., monument, beach) that may indicate the user is not at home. The content server 104 may also identify a family vacation narrative based on the visit to a relative's house. In one embodiment, the vacation narrative may include images from bins 3-8 and may exclude images from 1, 2, and 10 since the locations may be unrelated to a vacation. For example, bins 1, 2, and 10 may be in the hometown of the user while the locations in bins 3-8 may not be in the hometown.

Figure 3:
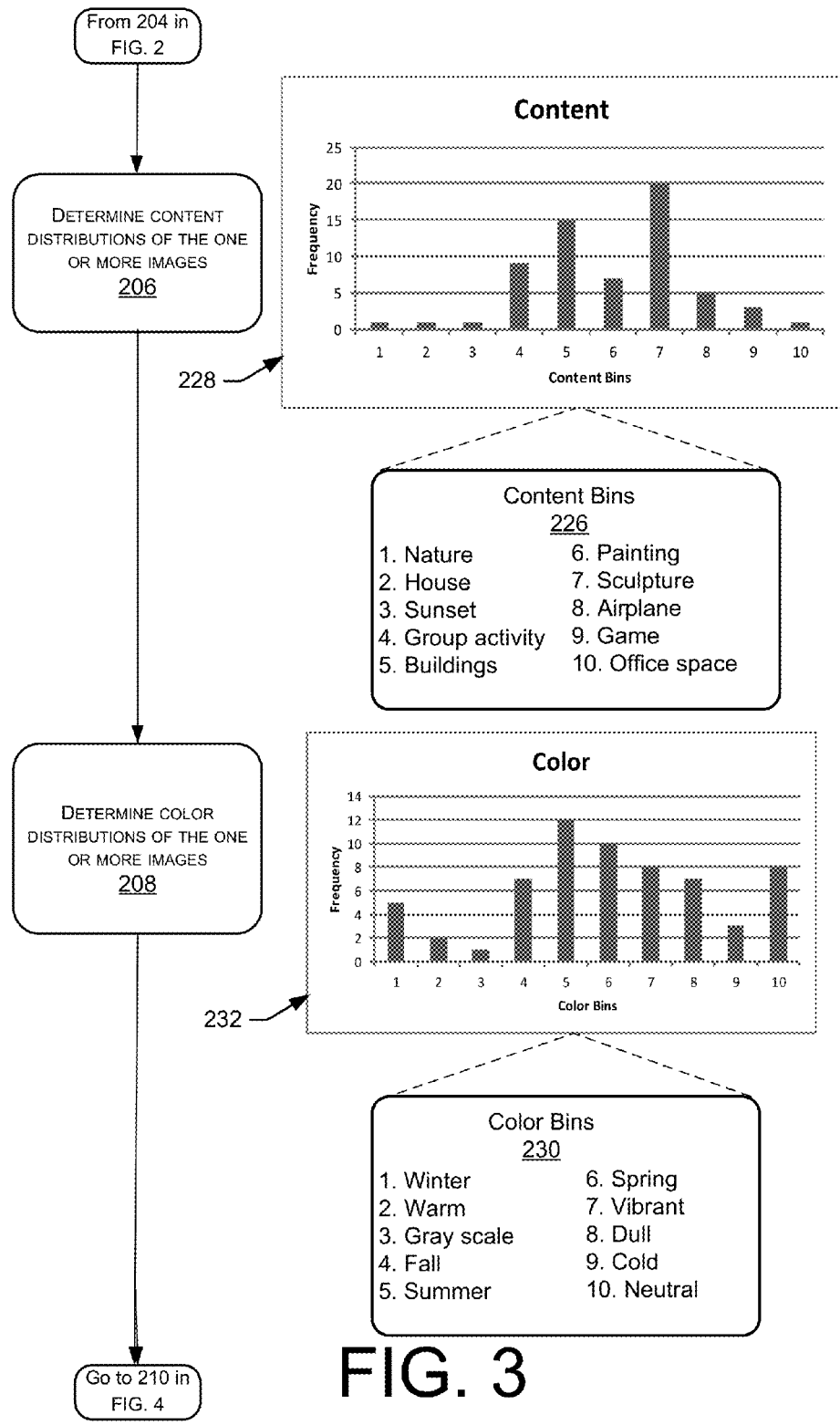
Figure 4:
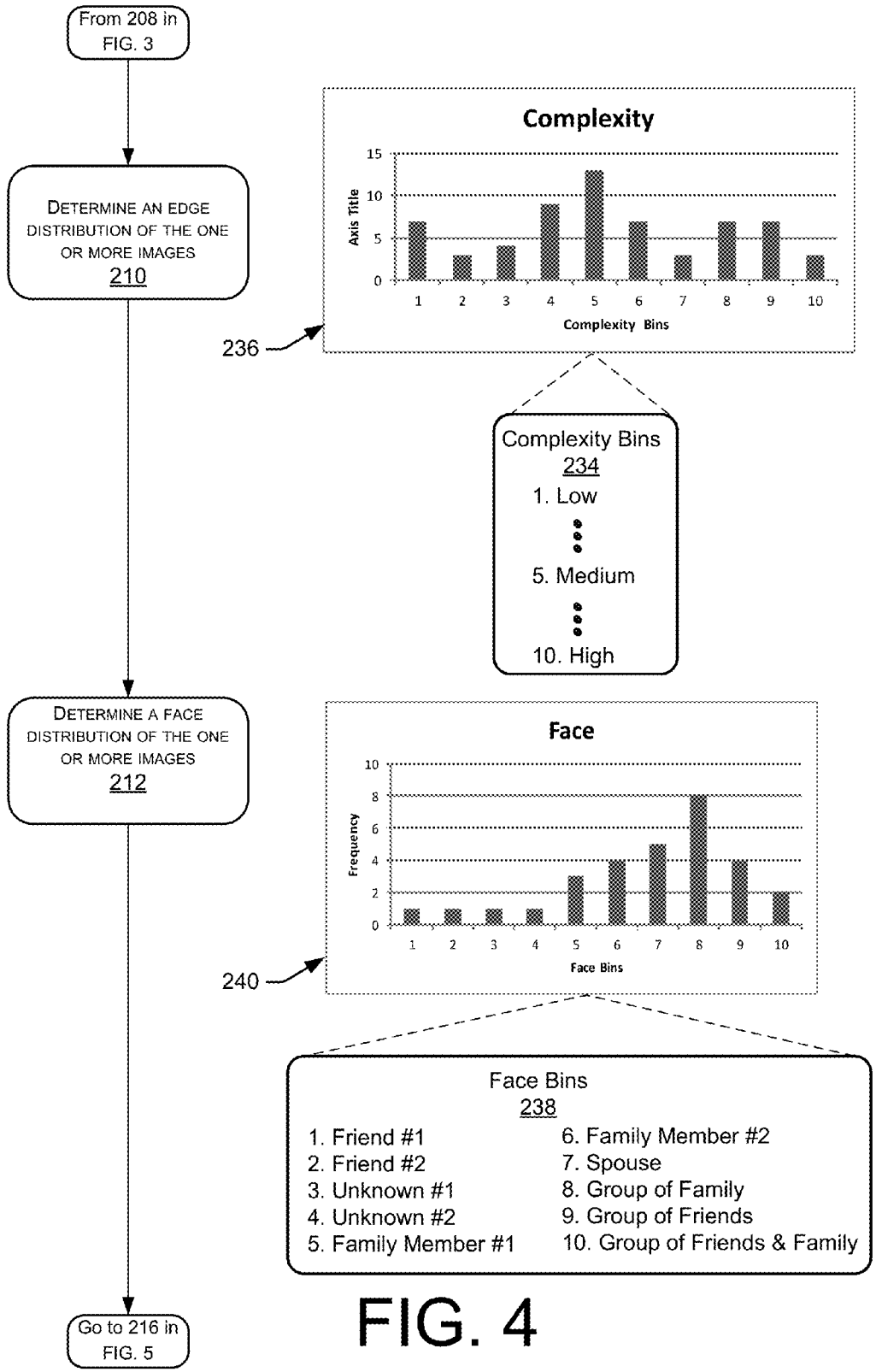
Figure 5:
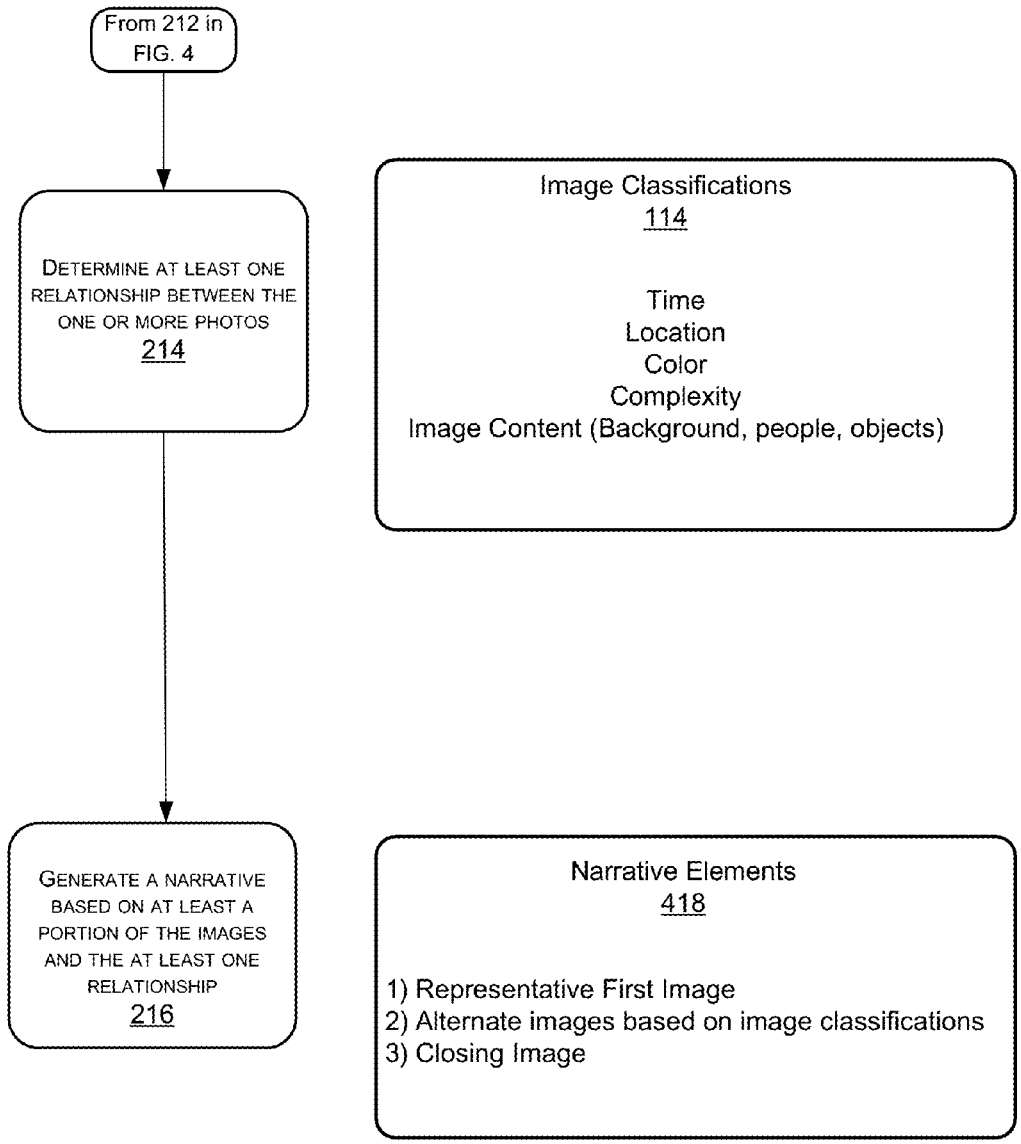

At block 206, as shown in FIG. 3, the content server 104 may determine content information associated with the images received from the user device 102. The content information may be attached to the information or the content server 104 may determine the content based on a recognition algorithm. The recognition algorithm may identify locations, objects, or features to associate with the image. The content server 104 may assigned the images to content bins that are assigned based on the content within the images. In the illustrated embodiment, the content bins may include nature, house, sunset, group activity, buildings, painting, sculpture, airplane, game, and office space.

In one embodiment, a narrative from the point of view of the content histogram 228 may include an art narrative that selects images from the buildings, painting, and sculpture bins (e.g., bins 5-7). Another narrative may include a sports narrative with the group activity and game bins, especially if they occur at a similar or nearby location to each other. In general, the content histogram may be used to identify narratives by determining which images may be related by similar or related content. In certain instances, the user may be queried for content explanations or clarifications for the content or whether the two or more content bins may be related to each other.

At block 208, the content server 104 may determine color information associated with the images received from the user device 102. The color information may be determined by the content server by analyzing the colors that are present in the images. The color palettes may include primary colors and mixtures of primary colors to cover any color spectrum that may be captured in the images. The color palettes may include, but are not limited to, gray scale, fall, summer, winter, spring, vibrant, dull, cold, or neutral as shown in the color bins 230 in the illustrated embodiment in FIG. 3. In one embodiment, the images may be binned in each bin in which the colors may be present in the images. Therefore, an image may be assigned to multiple bins. Since images may include several colors and the content server 104 may attempt to leverage the plethora of color palettes when selecting images to add color diversity to the narratives. The color histogram 232 illustrates the graphical representation of the color palette bin assignments.

In one embodiment, the color palette bin assignments may be limited to the color palettes that dominate the image, so that all of the colors in the image may not be used to assign the image to a color palette bin. The content server 104 may determine the surface area of the color palettes in the image and may select the color palettes with the largest surface areas for binning purposes. For example, the content server 104 may select the top three color palettes by surface area to use for binning purposes. In other embodiments, the number of color palettes may be four or more depending on the surface area covered by the color palettes.

In other embodiments, the number of color palettes for binning an image may be dependent upon the amount of color palettes that cover a surface area of the image past a threshold amount. For example, this may include selecting color palettes until the surface area covered by those color palettes exceeds percentage amount (e.g., 25%, 50%). Hence, the number of color palettes may be three or more until the threshold amount is exceeded or met.

At block 210, the content server 104 may determine complexity information associated with the images received from the user device 102. The complexity information may be based, at least in part, on the analysis of the images. In one embodiment, the content server 104 may perform a gradient analysis on the images to determine how many edges are present in the image and the sharpness of those edges. The edges represent changes in contours of the image and the higher the amount of edges or the greater density of the edges indicates a higher degree of complexity than an image with a lower amount of edges. A Canny edge detector technique may detect edges within an image. Broadly, the Canny edge detector technique may include image noise reduction and edge strength and direction determination. The image noise reduction may involve Gaussian smoothing of the image using one or more convolution methods to reduce outlier edge detections. The edge strength determination may involve taking the gradient of the image using a Sobel operator to perform a 2-D spatial gradient measurement of the image. The approximate absolute gradient strength at each point in the image may be determined in the x-direction and the y-direction. The higher strength gradients may indicate the presence of an edge in the image and the arrangement of those higher strength gradients provide an indication of a line or contour within the image. The higher amount of lines may indicate a higher level of complexity within the image.

In one embodiment, the content server 104 may rank the images based on an amount of edges in the image. The strength may be based on an absolute edge value or on a relative edge value compared to all the other images under analysis. The relative edge value may enable the content server 104 to make a clearer distinction on edge strength when the images may have a tighter distribution on edge strength rather than on an absolute scale.

In the illustrated embodiment, the complexity bin 234 illustrates a ranking that may be made in varying degrees from low, medium, to high. This may mean the bins 1-3 may include images with relatively few edges compared to the bins 4-7 that may have more edges or higher complexity. Bins 8-10 may include images that have higher complexity over the images in bins 1-7. The complexity histogram 236 illustrates a graphical example of one embodiment of a complexity determination.

In one narrative embodiment, the content server 104 may incorporate diversity into the narrative by alternating between images of higher and lower complexity. The complexity diversity may be used to prevent overwhelming a viewer with a series of highly complex images. However, the complexity diversity is merely one factor that may be considered during the narrative generation process. Narratives may not be required to implement complexity diversity for the sake of complexity diversity.

At block 212, the content server 104 may implement a facial recognition technique on the images received from the user device 102. Any facial recognition technique may be used to identify the faces of people captured in the images. The content server 104 may use a local library (e.g., contact list) or other available facial databases (e.g., social media, search engines) to identify faces in the images. The content server 104 may generate face bins to assign images to bins associated with known or unknown faces or groups of faces. For example, bin 1 includes an image of Friend #1 and bin 2 includes an image of Friend #2. Images of unknown individuals are each given their own bins (e.g., bin 3, bin 4). The content server 104 may also determine whether the faces belong to family members (e.g., bins 5-7). The content server may also generate bins for groups of people in the images that may include friends, family, and unknowns (e.g., bins 8-10).

The content server 104 may use the face bins 28 or the face histogram 240 to identify family and/or friend themes to incorporate into the image narratives. The face histogram segregates out individual and group photos and may enable the content server 104 to determine which photos are more likely to be included based on their frequency. For example, if more pictures of a one person or a group of people are taken, the narrative may likely include that person or group over another person or group that may be included in a smaller amount of photographs.

At block 214, the content server 104 may determine at least one relationship between two or more images received from the user device 102. In one embodiment, the relationship(s) may be based, at least in part, on the image classifications 114. The image classifications 114 may include, but are not limited to, time, location, color palette, complexity, and/or image content. The relationship(s) may be based on one or more of the image classification criterion. Broadly, the relationships may also be viewed as a theme or concept that may tie the images together. The themes may be a party or a sporting event (e.g., football game, Olympics) that may cover one or more periods of times and/or locations. Concepts that may include life events based on the activities of family members or friends. This may include documenting event that may take a relatively longer period of time to complete. For example, a baby's first steps or even a capturing a transition from crawling to walking that may take several months or years. In another example, the concept may include images related to sporting events taken over a timeframe of a season or seasons. The relationships, themes and/or concepts may also be based on anyone of, but is not limited to, the image classifications 114.

The content server 104 may determine a relationship based on times when the images were captured. Images may have a relationship in which they were captured within a common time frame. The content server 104 may be able to identify groups of images may be related to each other when they are captured within a certain time frame. For example, images captured within one hour of each other are more likely to be related to each other than pictures taken three days prior. The content server 104 may assign a relationship to the image in the one hour time window and may flag that group as a potential narrative source. However, the content server 104 may broaden that relationship based on other image classification information or any combination thereof.

In another embodiment, the content server 104 may determine that images may be related to each based, at least in part, on the time and location associated with the images. For example, the two groups of images taken three days apart in the previous embodiment may have also been taken at the same, similar, or nearby location. In one instance, the groups of images may have been taken at the same location. In another instance, the groups of images may be taken at another related location (e.g., both locations being tourist locations) that may indicate a relationship between the groups of images. This may include images taken at different tourist locations or taken at sporting events at different times and at different locations. In yet another instance, the relationship may be based on the two locations be nearby each other despite being taken three days apart. In certain instances, the content may also play a role in determining the relationship(s) between the images.

In another embodiment, the content and/or time classifications may also be used to determine relationships between the images. Content relationships may be based on the recognition of people, places, and/or things in the images. Relationships between images that share common or similar people, places, and/or things may be identified by the content server 104. In one embodiment, the people may be identified by the faces and those images that share common people may be related to one another. Although images with different faces may also be related together when the content server 104 identifies other content features that may deserve a relationship link. This may include photos of people wearing the same or similar clothes (e.g., sporting event, people at a costume party) or performing similar types of actions (e.g., biking, running, dancing, etc.).

Content and time classifications may be viewed together to determine additional relationships that may exist. For example, images that may be related by content may also be related by time, which may be helpful in generating narrative. For example, images that include the same people wearing the same clothes (e.g., uniform) may represent a content relationship. The relationship may be strengthened when the content server 104 determines a periodic interval may be associated with the groups of images. This may include images captured during a sporting event over the course of the season. This information may be helpful to establish a time sensitive narrative between the groups of images. Although narrative may be generated for each game, another narrative may also be generated based on the course of the season.

Content and location classification may be used to determine additional relationships that may be used to generate a narrative(s). The content and location combination may be used to determine a relationship between images that may not be easily determined by content alone. For example, images captured at the same location may include a variety of people that may or may not be identified by the content server 104. In this case, the content may include people wearing business casual clothes interacting with each other. The relationship may be strengthened when the content server 104 determines the images were taken at work or a networking event that was scheduled (e.g., calendar event) at that location. Accordingly, a work related narrative may apply to these images as a single event. However, the images may also be related to other work related images that have been taken over time. Hence, another narrative may also cover a string of work related images taken at different locations and/or times.

In one embodiment, the color palette classification may also be used to establish a relationship between two or more images. The color palette relationships may be based on the types of color palettes or color palette combinations detected in the images by the content server 104. For example, images with similar color palette schemes may be grouped together to enable the content sever 104 to create a library of images that may be used to increase color palette diversity within the narratives. This also may include determining which images may a have content, time, or location relationship in addition to the color palette relationship. In certain instances, images with an existing relationship may be further segregated by their color palette schemes to easily select images for a narrative while maintaining color palette diversity. For example, the content server 104 may select images related to a location by alternating between images with different or slightly different color palette schemes to implement color palette diversity within the narrative.

In another instance, the color palette relationships may also be determined based on the amount of color palettes shown in the images. This may include determining the surface area covered by certain color palette schemes and assigning a relationship between images that have similar color palettes and covering a similar surface area. This relationship may highlight images that are similar to each other and may enable the content server 104 to select images that enhance diversity within the narrative. For example, the content server may select several images with the same color palette scheme, but they surface area relationship may enable of images that may include different surface areas of that color palette. In this way, the narrative may have some diversity by selecting images of a certain color palette scheme that may have different variations in surface area. Accordingly, this may enable the content server 104 to include a small amount of diversity when a particular color palette scheme dominates the images.

In another embodiment, the content server 102 may determine complexity relationships between two or more images received from the user device 102. The complexity relationship may be based on the level complexity (e.g., low, medium, high) within each image. The content server 104 select images for a narrative based on complexity. However, the content server may also use the complexity relationship in conjunction with other image classifications (e.g., time, location, etc.) to select images with varying complexity. For example, a narrative based on time may select between higher and lower complexity relationships to minimize the impact of the narrative including only high or low complexity images. The content server 104 may select images that vary in complexity to create a balanced a narrative.

At block 216, the content server 104 may generate one or more narratives based on a portion of the images received from the user device 102. The narratives may be based on the one or more image classifications 114 and/or one or more the relationships established between the images. Broadly, the narratives are a storyline or concept for a series of images used to maintain a viewer's interest by providing a cohesive and visually diverse sequence of images. Narratives may be broadly or narrowly construed based on the available image classification information.

In one embodiment, the content server 104 may generate a narrative based on one image classification as described above in the previous operations of the method 200. The narrative may be based on any one of the image classifications 114. For example, the narrative may be based on time by using images that were taken within certain time frame. As noted in the discussion for block 202, the time frame narrative may encompass a group of images captured within a certain time period that may indicate a strong relationship between the images. For example, user history may be used to determine the significance of the time frame. When the user captures images every day, the significance based solely on the time frame may be less than when the user captures images on a weekly or monthly time frame. A narrative based solely on the time frame may be more meaningful to the user when the user captures images on an infrequent basis. Additional single narrative examples are described above in the discussion of blocks 204-212.

In one embodiment, the content server 104 may generate a narrative on based on one relationship between two or more image classifications (e.g., time and location). As noted above in the discussion of block 214, the relationships may tie groups of images together based on time and location. For example, when the user captures several images a day the content server 104 may have difficulty determining which images may be related to each other. However, when the groups of images are taken at different locations the content server 104 may be able to determine a narrative that may exist for each location or that images captured at different times at the same location may also be related. Accordingly, the content server 104 may generate narratives for individual locations during separate time frames. Alternatively, the content server 104 may generate a narrative that may tie images together from the same location that are captured at different times. This narrative may also include a sequential element that arranges the images based on the time they were taken.

In another embodiment, the content server 104 may generate a narrative based on one or more relationships between two or more image classifications. The narratives may be based on time, location, and/or content classifications that tied together by similarities in time patterns, location patterns, or content patterns. As noted above, this may include sporting events that are played at different locations, different times, but may include similar content like players wearing the same or similar uniforms or performing similar actions as captured in previous events. The content server 104 may determine several relationships between the images and may generate several narratives to provide several options that may be selected by the user.

In the narrative embodiments above, the content server 104 may have established the relationship between the images. A portion of these images may be selected and arranged into a narrative that may be representative of the captured images and may include image classification diversity to maintain user's interest. The narrative may include elements that are consistent with the image classification 114 criterion. They may be selected and arranged based on, but not limited to, time, location, color palette, complexity, faces, and/or content. As noted above, the narratives may be includes the image classification themes which may also include a diversity element that reduces the likelihood that the images look the same look and feel. In certain instances, the diversity of the narrative may be increased by arranging images that may have a different color palette, complexity, and/or content based on the images position or ranking within their respective histogram (e.g., color palette histogram 232, etc.). In certain instances, the content server 104 may arrange images to increase the change in the look and feel of each image. However, there are exceptions, in which the image classifications 114 may dominate. In one specific example, the time line of the images may be critical when the captured images are for an event that unfolds over time and the sequence of captured images are more important to the narrative than image diversity. As a result, the content server 104 may determine to generate multiple narratives using the same set of images and optimizing the image arrangement to focus on time, location, and/or content ahead of image diversity. Alternatively, a portion of the narratives may also include an arrangement that highlights image diversity from the point of view of color palette, complexity, and/or content.

In one embodiment, the content server 104 may also attempt to generate a narrative that may include an image that is representative of the narrative to be shown first, one or more intermediate images, and a final image that may represent a conclusion of the narrative. The representative image may be determined based on the image classifications 114. The first image may include determining a reason why the images are taken, the type of events or content captured in the image, a common element between a portion of the images.

The reason why the images were taken may be found in the meta-data attached to images. The meta-data may indicate the images were taken as part of a family trip, a school or work assignment, or a sporting event. The type of content or event may also be determined by analyzing the content captured in the images to determine whether the people or objects are recognizable. The content server 104 may identify family members and determine the event is family related. When the content server 104 may identify friends or co-workers the event may be determined personal or work related. The content server 104 may also determine the type of event based on analyzing inanimate objects in the images. For example, identifying a birthday cake to determine the event may be a party or recognizable monuments to determine the event may be a vacation. These assumptions may be further supported by the location information attached to the images. For example, are the celebratory events near their home or in another state or country or in a location that is not associated with their location history or near a location that is associated with their social media contacts (e.g., friends and family). This additional information may be used to distinguish between a family celebration or a vacation. The content sever 104 may also search for common elements (e.g., people, places, or things) that may be captured in more than one image. This may also involve identifying common image classification trends. Common times, locations, color palettes, and/or faces may indicate a string of events that may be related to each other from a social point of view. These trends may apply to identifying short term or repetitive events (e.g., weekly happy hour events) to longer term or infrequent events (e.g., family vacation trips).

As noted above, the content server 104 may generate several narratives from the same group of images based, at least in part, on the analysis described above. The narratives may alternate between focusing on specific trends or image classifications 114 to provide several narrative options that may be selected for publishing or sharing. The narratives may also use information from more than one image classification (e.g., time and location) to generate narratives. As indicated above, the combination of image classifications to identify narrative themes may produce narratives that are more on point for large groups of images that may not be easily categorized or segregated based on just one image classification criteria.

Figure 6:
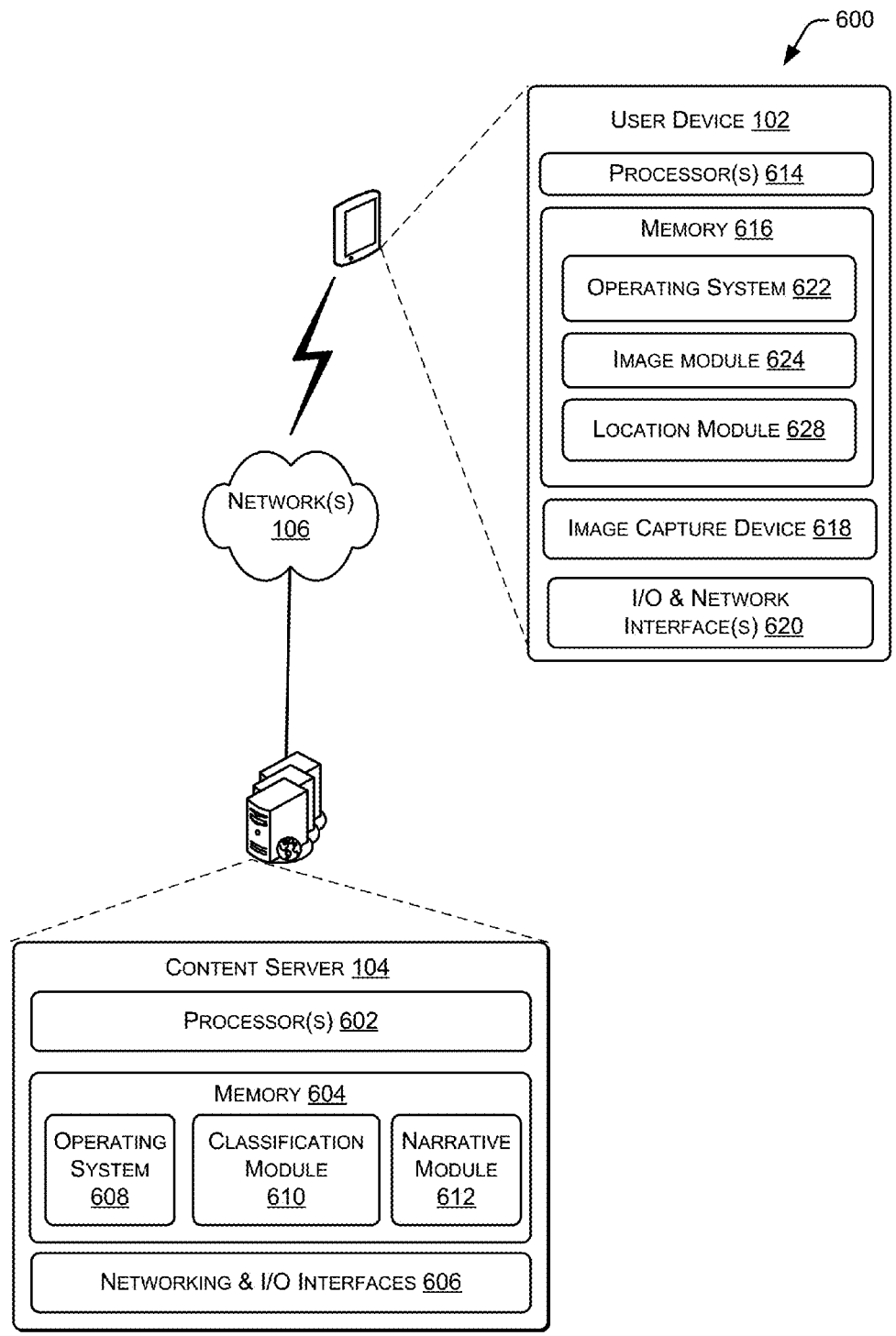
FIG. 6 illustrates a system for classifying image and arranging the images into a narrative in accordance with one or more embodiments of the disclosure.

FIG. 6 illustrates a system 600 for capturing, classifying, and arranging the images into a narrative based, at least in part, on the image classifications 114 described above. The system may include a user device 102 that captures the images and provides the images to a content server 104 using a network 106. The content server 104 may analyze the images and select a portion of them to generate one or more narratives that a user may publish or share using social media or any other electronic distribution system. While a single user device 102 and a single content server 104 are shown, it is understood that any number of these devices may be present in the system 600.

The content sever 104, which may include one or more processors 602, a memory 604, and one or more network and input/output (I/O) interfaces 606.

The computer processors 602 may comprise one or more cores and are configured to access and execute (at least in part) computer-readable instructions stored in the one or more memories 604. The one or more computer processors 602 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The content server 104 may also include a chipset (not shown) for controlling communications between the one or more processors 602 and one or more of the other components of the content server 104. In certain embodiments, the content server 104 may be based on an Intel® architecture or an ARMO architecture and the processor(s) 602 and chipset may be from a family of Intel® processors and chipsets. The one or more processors 602 may also include one or more application-specific integrated circuits (ASICs) or application-specific standard products (ASSPs) for handling specific data processing functions or tasks.

The network interfaces 606 may also comprise one or more communication interfaces or network interface devices to provide for the transfer of data between the content server 104 and another device directly such as in a peer-to-peer fashion, via a network 106, or both. The communication interfaces may include, but are not limited to: personal area networks ("PANs"), wired local area networks ("LANs"), wireless local area networks ("WLANs"), wireless wide area networks ("WWANs"), and so forth. In FIG. 6, the content server 104 is coupled to the network 106 via a wired connection. However, the wireless system interfaces may include the hardware and software to broadcast and receive messages either using the Wi-Fi Direct Standard (See; Wi-Fi Direct specification published in Oct. 2010) and or the IEEE 802.11 wireless standard (See; IEEE 802.11-2007, published Mar. 8, 2007; IEEE 802.11n-2009, published Oct. 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the content server 104 and another device such as an access point, a host computer, a server, a router, a reader device, another content server, and the like. The network 106 may include, but is not limited to: the Internet, a private network, a virtual private network, a wireless wide area network, a local area network, a metropolitan area network, a telephone network, and so forth.

The one or more memories 604 comprise one or more computer-readable storage media ("CRSM"). In some embodiments, the one or more memories 604 may include non-transitory media such as random access memory ("RAM"), flash RAM, magnetic media, optical media, solid state media, and so forth. The one or more memories 604 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 604 may store an operating system 608 that includes a plurality of computer-executable instructions that may be implemented by the processor 602 to perform a variety of tasks to operate the interface(s) 606 and any other hardware installed on the content server 104. The memory 604 may at least include a classification module 610 and a narrative module 6126.

The classification module 610 may receive a group of images from a user device 102. The images may include information related to the time of capture, location of capture, and/or content captured in the images. As discussed above the descriptions of FIGS. 1-5, the content server 104 may classify the images based at least on the image classification criterion 114. In one embodiment, the images may be grouped based on their image classifications, see FIG. 1. In another embodiment, the images may be grouped based on the image classifications and ranked or segregated into histograms (e.g., time histogram 220, etc.) that highlight the distribution of the images within their respective image criteria.

The narrative module 612 may select a portion of the classified images and arrange them into one or more narratives based, at least in part, on classification information that may indicate the images may have a relationship with each other. The narrative concepts are discussed above in the description of blocks 112, 214, and 216. At high level, the narrative module 612 may identify common aspects between the images and select them to be arranged into the narrative. Additionally, the narrative module 612 may arrange the images to provide diversity between the images. In one embodiment, the narrative module 612 may arrange the images in order to maintain diversity between the color palette and complexity to create a diverse image experience as the viewer views the images. In this instance, the duplicate or substantially similar images may not be adjacent to each other or may not be included together in the same narrative. The narrative module 612 may balance between the narrative theme and the image diversity to generate a narrative that may include sequentially similar images on one end of the spectrum and sequentially diverse images on the other end of the spectrum. For example, in certain instances, similar images may be arranged near each other to generate a time sensitive narrative that provides a timeline of an event (e.g., sporting event) captured in the images. Particularly when the narrative is limited to images from a single location. In another instance, emphasis of image diversity of adjacent or nearby images may be stronger when the narrative is able to tell a story (e.g., family trip) that is independent of a timeline or a single location.

The user device 102 may be any type of device that may be equipped to capture images. The user device 102 may include, but is not limited to, cameras, smartphones, laptops, desktops, tablet computers, televisions, glasses, set-top boxes, game consoles, in-vehicle computer systems, and so forth. In one embodiment, the user device 102 comprises a tablet computer that may include processor(s) 614, memory 616, image capture device 618, and network and I/O interface(s) 620.

The one or more processors 614 may individually comprise one or more cores as described above and are configured to access and execute (at least in part) instructions stored in the one or more memories 616. The one or more memories 616 may comprise one or more CRSMs as described above.

The one or more memories 616 may store instructions for execution by the one or more processors 614 which perform certain actions or functions. These instructions may include an operating system 622 configured to manage hardware resources, such as the interfaces 620, and provide various services to applications executing on the one or more processors 614.

The one or more memories 616 may also store lists, arrays, databases, flat files, and so forth. In some implementations, the memories 616 may be stored in memory external to the user device 102, such as with a cloud storage service.

The one or more memories 616 may also store a variety of information, applications, and/or modules related to the capture and display of images. The applications and modules may include, but are not limited to, an image module 624, a meta-data module 626, and a location module 628.

The image module 624 may store the images captured by the user device 102. The image module 624 may enable the user device 102 to attach information to the images as they are captured. The information may include a time stamp, location, lighting conditions, or any other information that may be associated with an image that may be classified by the content server 104. The image module 624 may also enable a user (not shown) of the user device 102 to attached information to the images that may clarify the purpose of the image or the content of the image.

The location module 628 may determine the location of the camera device 102. The location module 628 may comprise a global positioning system or any other positioning device that may use any technique to determine location of the user device 102. The location information may be provided to the imaging server 114 over the network 112. In certain instances, the location module 628 may receive location information from the content server 104.

The image capture device 618 may include any type of optical lens arrangement that may be used to capture images. The image capture device 618 may also include flash component that may provide artificial light to increase the amount of lighting available to capture an image. In some embodiments, the image capture device 618 may be configurable to use different types of lenses, filters, or flash components.

The I/O interfaces 620 may enable the coupling devices such as keyboards, joysticks, touch sensors, cameras, microphones, speakers, haptic output devices, memories, and so forth to the user device 102. The haptic output device may comprise one or more actuators, signal generators, and so forth. For example, the haptic output device may generate direct electrical stimulation of nerves of the user, actuate a piezoelectric element, actuate a motor, and so forth. The network interfaces 620 may also include a wireless or wired communications interface or a network interface device that enable the app device 104 to send and receive communications over the network 106. The wireless communication systems (not shown) may be similar to the wireless system described above.

Figure 7:
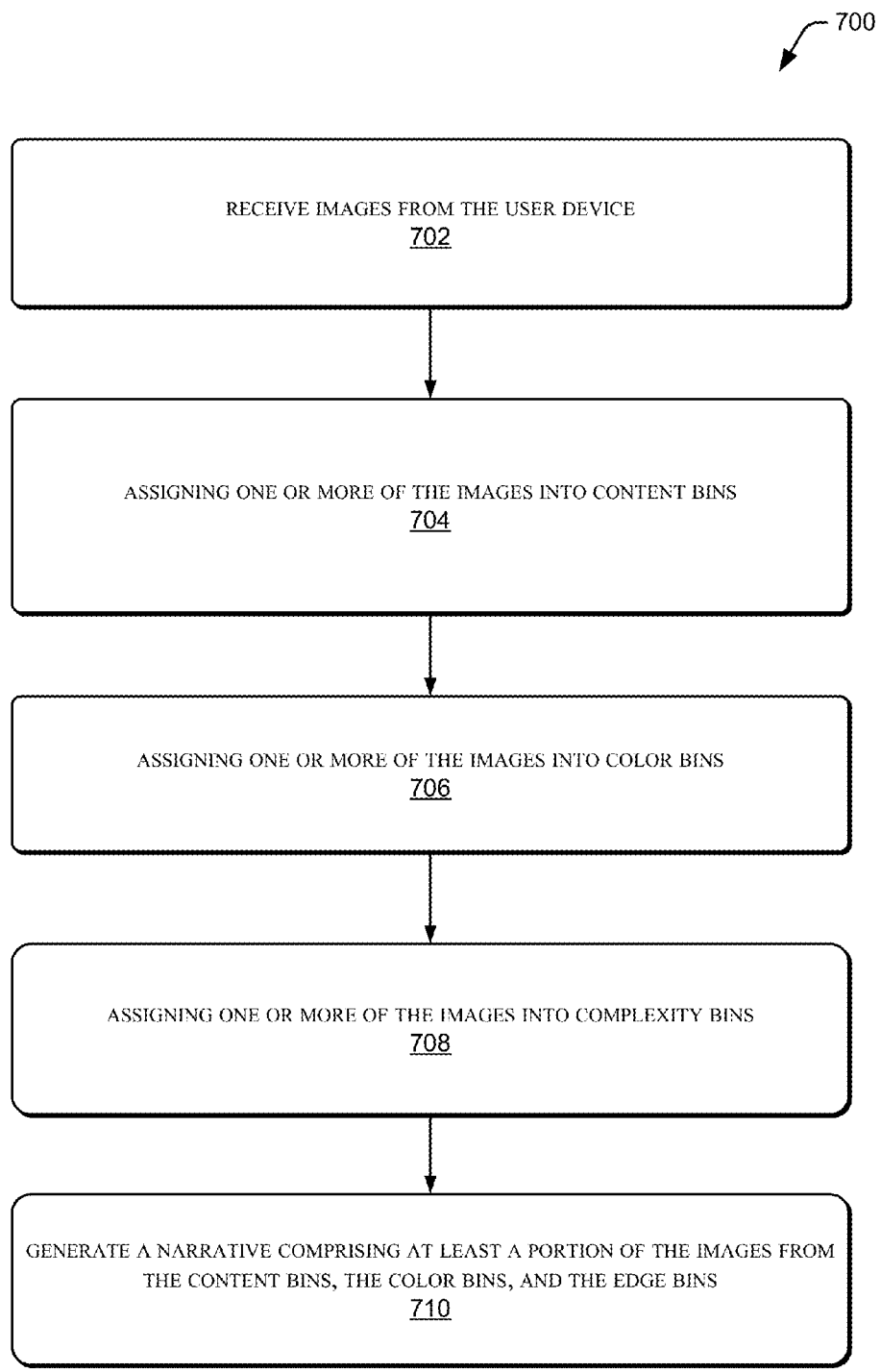
FIG. 7 illustrates a flow diagram for a method of assigning images to histogram bins and arranging a portion of the images based, at least in part, on the histogram bins in accordance with one or more embodiments of the disclosure.

FIG. 7 illustrates a flow diagram for a method 700 for assigning images (e.g., image 118, etc.) to histogram bins (e.g., time bins 216, etc.) and arranging a portion of the images based, at least in part, on the histogram bins to generate a narrative of images. It should be noted that in other embodiments the sequencing of the method 700 may be altered and some operations may be omitted.

At block 702, the content server 104 may receive images from a user device 102 that captured the images. The images may include embedded information related to the time of capture, location of capture, and/or content explanations. The embedded information may be attached by the content server 104 or attached by the user entering the information into user device's 102 interfaces 620.

The content server 104 may receive the images from the user device 102 via the network 106, which may include a wireless or wired configuration or a combination thereof. The received images may be store in memory 604 and queued or flagged for processing by the classification module 610 using the processor 602.

At block 704, the content server 104 may classify the images by assigning or segregating the images based on the embedded information or the content within the images. In one embodiment, the content server 104 may generate image classifiers 114 that may be used to assign the images to one or more bins of classifier histograms (e.g., content histogram 228, etc.).

In one embodiment, the content server 104 may assign one or more of the images into content bins of a content histogram 228. As described above in the discussion of block 206, the content bins may be generated based on a content analysis of the images. The bins may be broad or specific depending on the content analysis and are descriptive of the content within the images or the content information embedded in the image. For example, the bins may be related to objects captured in the image such as a building, a sporting event, a nature scene, or a party. Images may also be assigned to one or more bins based on the image classification 114 criterion.

At block 706, the content server 104 may also assign the one or more of the images into color palette bins 230 based, at least in part, on the types of color palettes detected in the image. In one embodiment, the images may be binned on all the color palette identified within the image. This may mean that images may be assigned to more than one bin. In another embodiment, the images may be binned based upon the dominate color palettes detected within the image. For example, the images may be assigned to bins for the top three color palettes by surface area in the image. In another instance, the color palette binning may be set by a threshold amount. This may require a color palette to cover a surface area threshold percentage to be assigning to a color palette bin. For example, this may involve assigning an image to a color palette bin when that color palette covers at least about 15% of the surface area of the image. The 15% threshold is merely an exemplary threshold and the threshold may vary from about 1% to 100%. Under this embodiment, the content server 104 may generate a color palette histogram 232 that may illustrate distribution of images that have large surface areas of color palette.

At block 708, the content sever 104 may also assign one or more of the images into complexity bins 234 which indicate a level of complexity within the image. In one embodiment, the complexity of the image may be based on an amount or density of edges that are within the image. As noted in the discussion of block 210, the edges represent the different contours that are formed by different objects within the image. In certain instances, the edge analysis may be detailed enough to be used to recognized the object within the image. The edge analysis technique is described above in greater detail in the discussion of block 210.

In another embodiment, the complexity may also be determined by the amount of the amount of color palettes captured within the image. An image may have a higher complexity when the amount of color palettes over a surface area exceed threshold amount. For example, when comparing similar sized images, the content server 104 may use the entire surface area to determine the amount of color palettes or color palette transitions within the image. Based on the amount of color palettes, the content server 104 may determine which images have more color palette than other images. The color palette images may be ranked based on the amount of color per surface area to provide a complexity ranking scale on color palettes in an image.

The content server 104 may also assign images to bins for histograms for a variety of other image classification criterion. The images may also be assigned to time bins, location, bins, and/or face bins.

The time information associated with when the image was captured may be used to bin the images as described above in the discussion of block 202. The time bins may provide a distribution that highlight when images were taken and if they were taken together or at different times. The time bins 218 may provide an indication of a relationship between the images that are taken together. The time bins 218 may also indicate when images are captured on a periodic basis that may indicate that at least two groups of images taken at different times may also be related to each other.

The location information associated with when the image was captured may be used to bin the images as described above in the discussion of block 204. The location bins 222 may group images together based on where they were captured. The location distribution 224 may indicate a strong interest for a high number of images taken at a single location or locations. The location information may be helpful to determine a narrative theme based on the amount of images taken at the location. Further, the location information may be used to determine whether the user was on vacation, at a sporting event, or other event that may be used to generate a narrative.

The content server 104 may determine the identity of faces that are captured within an image and bin (e.g., face bins 238) those images to determine how many times a face or group of faces appears in the images. The identity information may be used to determine relationships between images and to highlight which people are more likely to be included into a narrative. This facial recognition binning is described above in greater detail in the discussion of block 212.

At block 710, the content server 104 may generate a narrative comprising at least a portion of the images from the content bins, the color palette bins, and/or the edge bins. As described above in the discussion of blocks 214 and 216, the narrative may be based on relationships between the images and themes determined by classifying the images. For example, the content server 104 may determine that a group of images are related to family vacation based on the location, timing, content, and/or faces in the images.

As noted above, the narrative may include a first image that is representative of the narrative. The intermediate images may be chosen based one or more narrative aspects related to time, location, and/or content of the images. In certain instances, the content server 104 may also arrange the images in an order that creates diversity between the images. The diversity may be based on the image classifications 114 (e.g., color palette, content, etc.) and their distribution within their histogram (e.g., color palette histogram 232). Diversity may be used to prevent selecting duplicate images and to create a diverse viewing experience that may maintain the interest of the user as they view the images. The narrative may also include a final image that may indicate a conclusion to the narrative. For example, the final image may be arriving home from a vacation or an image of a transportation center (e.g., airport, port, etc.) that indicates the conclusion of a trip. This may also include people leaving a party or waving to indicate the conclusion of an event (e.g., party, sporting event).

Figure 8:
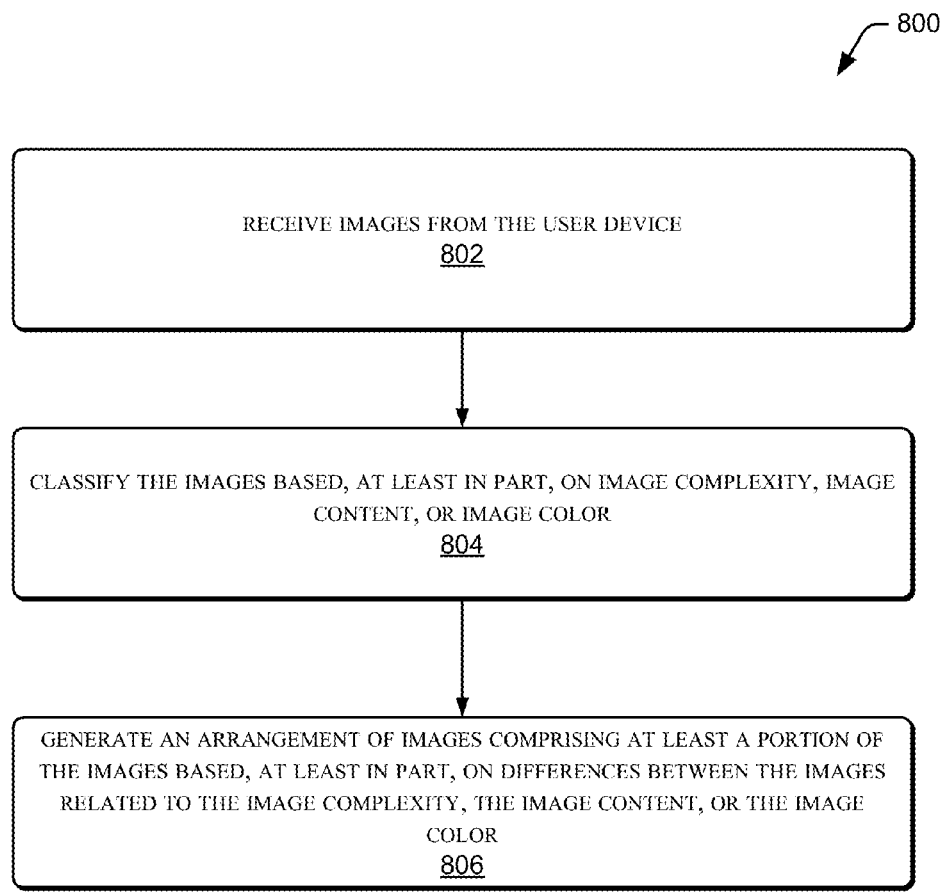
FIG. 8 illustrates a flow diagram for another method for classifying images and arrangement the images into a narrative in accordance with one or more embodiments of the disclosure.

FIG. 8 illustrates a flow diagram for another method 800 assigning images (e.g., image 118, etc.) to histogram bins (e.g., time bins 216, etc.) and arranging a portion of the images based, at least in part, on the histogram bins to generate a narrative. It should be noted that in other embodiments the sequencing of the method 800 may be altered and some operations may be omitted.

At block 802, the content server 104 may receive images from the user device 102 via a network 106. The images may include embedded information related to the time of capture, location of capture, and/or content explanations. The embedded information may be attached by the content server 104 or attached by the user entering the information into user device's 102 interfaces 620.

At block 804, the content server 104 may classify the images based, at least in part, on image complexity, image content, or image color palette as described above in the discussion of blocks 206, 208, and 210. As noted above, the image complexity may be based, at least in part, on a density of edges within the image. The image content may be based, at least in part, on a type of object captured in the image and the image color palette is based, at least in part, on an amount of distinguishable color palettes captured in the image. In other embodiments, the classifying of the images is further based, at least in part, on a time the image was captured, a location of where the image was captured, one or more persons captured, or the type of content captured in the images.

At block 806, the content sever 104 may generate an arrangement of images comprising at least a portion of the images based, at least in part, on differences between the images related to the image complexity, the image content, or the image color palette. The difference between the images may prevent duplicate or substantially similar image from being adjacent to each other in the arrangement. Further, the differences between the image may enable the images to have enough diversity from adjacent images to maintain viewer interest in the narrative.

Figure 9:
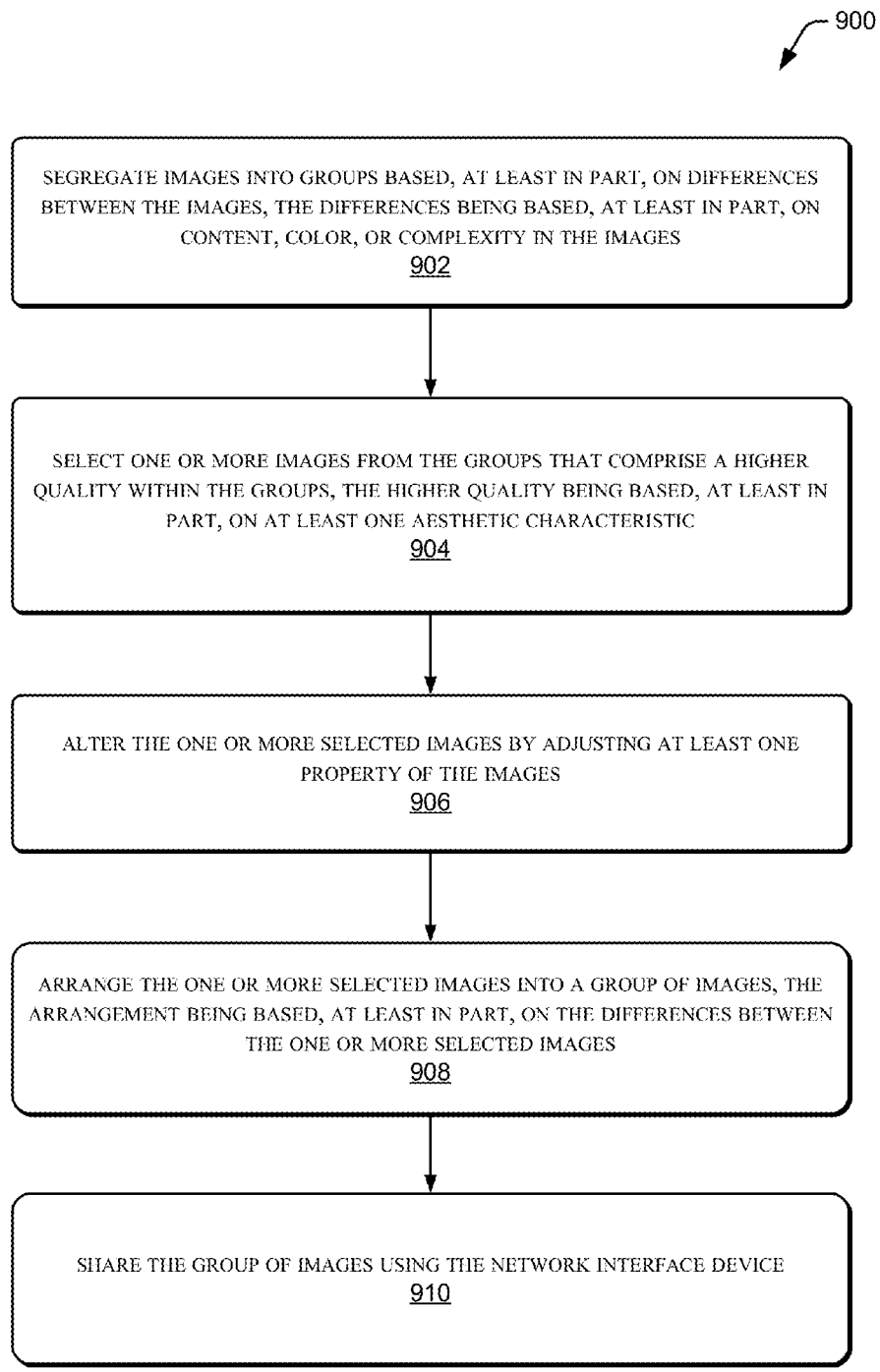
FIG. 9 illustrates a flow diagram for a method for generating a narrative of images based on the differences between the images in accordance with one or more embodiments of the disclosure.

FIG. 9 illustrates a flow diagram for a method 900 for generating a narrative of images based on the differences between the images. The narrative may include an arrangement or group of images selected based on common relationship or theme between the images. The narrative images may also be selected based, at least in part, on their differences to increase the amount of diversity in the narrative. For example, this may reduce the likelihood that duplicate or substantially similar images are included the in the narrative. It should be noted that in other embodiments the sequencing of the method 900 may be altered and some operations may be omitted. In one embodiment, the content server 104 may perform the method 900, but in other embodiments, the method 900 may be performed by the user device 102 or a combination of the content server 104 and the user device 102.

At block 902, the content server 104 may segregate images into groups based, at least in part, on differences between the images. The differences being based, at least in part, on content, color, or complexity in the images. The content may include the subject matter captured in the images. The subject matter may include the people, place, or things captured in the image. The difference types of content may include the elements described above in the discussion of FIG. 3. In one instance, the colors may include the color palettes described above at least in the discussion of FIG. 3. As noted above in the discussion of FIG. 4, complexity may be based, at least in part, on an amount of detail within the image. The amount of detail within an image may include the degree of resolution, the amount of contours, colors, or content. In one particular embodiment, complexity may be based, at least in part, on an amount of edges in the image. As noted above, the edges may be an indication of a change in magnitude of a characteristic of the image between two locations in the image.

In another embodiment, the difference analysis may also include additional components that include, but are not limited to, the location, time, or facial recognition. The location of the image may be included in the meta-data of the image. The location may include the address, the coordinates (e.g., latitude, longitude), or any other notation that may indicate the location of where the image was captured. The time may include a time stamp of when the location was captured. This may include the date, hour, minute, and second of when the image was captured. In another embodiment, the identity or facial identity of the people captured in the image may also be used in the difference analysis as described above in the discussion of FIG. 4.

At block 904, the content server 104 may select one or more images from the groups that comprise a higher quality within the groups. The higher quality may be based, at least in part, on at least one aesthetic characteristic in the image. In one embodiment, the aesthetic characteristic may include one or more of the following: clarity, brightness, contrast, saturation, or sharpness. Clarity may include the degree focus within the image, such that the images are more likely or less likely to be seen in sufficient detail. This may include whether the degree of focus that may make the image clearly recognizable and/or the degree of resolution of the image in which the level of detail that may discernible within the image. Brightness adjustments may impact the level of darkness (e.g., black) or lightness (e.g., white) of the image. Contrast may represent the difference between the darkest and brightest areas of the image. Increasing contrast may increase the difference between the dark and bright areas of the image. An increase in contrast may make the image more vibrant. Decreasing contrast decreases the difference between dark and bright and may make the image appear duller. Saturation may represent the difference between colors in the image. Sharpness may represent the difference in contrast along the edges or contours found in the image. Hence, changing sharpness impact the edges in the image, while have a lower impact on the flat areas (e.g., non-edges) of the image.

At block 906, the content server 104 may alter the one or more selected images by adjusting at least one property of the images. The properties may include, but are not limited to, image size or removing elements or portions of the image. For example, this may involve cropping the image that removes a portion of the image that may include a person or element the user does not want to include in the image. Elements within the image may also be removed by replacing the element with a background feature that masks or covers up the elements so that the element is not visible in the image.

In another embodiment, the content server 104 may add properties to the images. These properties may include, but are not limited to, music to be played when the images are shown. The same song or music selection may be played throughout the showing of the images or individual music selections may be selected for individual or a smaller group of images. The content server 104 may also provide a background of the images. The background may be representative of the theme of the images. For example, when the images show a birthday party or holiday party, the background may be consistent with those themes or content of the images.

In another embodiment, the content server 104 may add a map indicating the locations of where the images were taken. The map may be used cover image in the arrangement described below to indicate that the images are related to trip made by the person who captured the images.

At block 908, the content server 104 may arrange the one or more selected images based, at least in part, on the differences between the one or more selected images. The arrangement may also be based on the relationships between the images. For example, the images may document a trip or an event that includes several images that are related to each other based, at least in part, on location, time, persons, or any other criteria. Based on this relationship, the content server 104 may arrange the images based, at least in part, on the differences between the images to develop diversity between the images. This may mean that duplicate images may not be used in the arrangement. The diversity between images may be used to maintain a viewer's interest in the images while viewing the arrangement. The viewing may include viewing the images one at a time, in a collection of images (e.g., two or more images), or all the images at one time.

In one embodiment, the content server 104 may arrange the images to include a beginning, a middle, and an end to maintain a viewer's interest. For example, the arrangement may include a cover image that indicates a theme of the arrangement that provides an introduction to the arrangement. This may include, but is not limited to, an image that sets the tone of the arrangement whether the images are related to a trip, an event, or a locale. For example, the cover image may include an image showing the airport to indicate a start of a trip or people packing for a trip. The cover page may also be an image of the trip destination that includes a recognizable feature (e.g., beach, landmark, skyline, etc.) of the destination.

The intermediate images (e.g., the middle) may be selected based on their relative diversity to each other with regard to content, color, complexity, time, facial recognition, or location. These images may also be based on timeline that may be appropriate for the trip or event. For example, when the images pertain to a sporting event, the image may be partially arranged based on the timeline (e.g., start, middle, and end) of the event. However, the content server 104 may maintain diversity between the images to minimize the similarity of the images within the arrangement.

In another embodiment, the arrangement may also include a concluding image that indicates a conclusion to the arrangement. This may include images of people returning from a trip or images of the competition of an event. For example, this may include pictures of people returning home from the trip or a scoreboard indicating the end of a sporting event.

At block 910, the content server 104 may share the arrangement of images using the network interface device 606. The sharing may include providing the image arrangement of images to remote servers that may publish the images on social media outlets or services. The remote servers may enable other users to view, comment, edit, and/or share the images.

Figure 10:
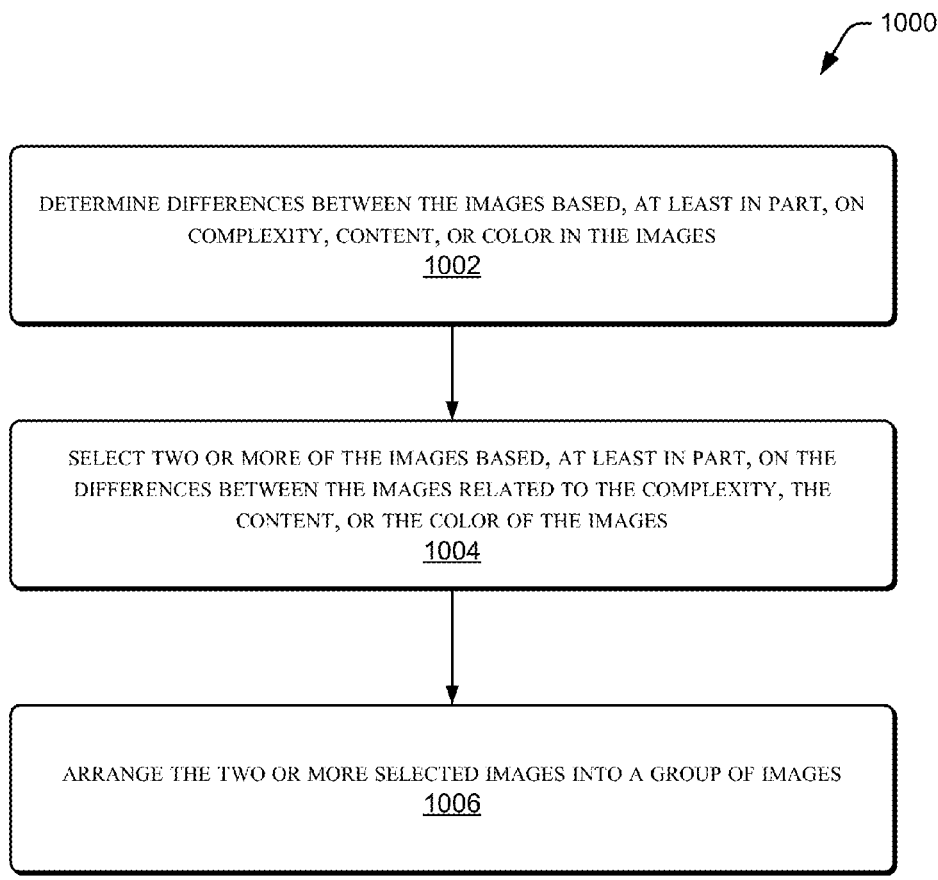
FIG. 10 illustrates a flow diagram for another method for generating a narrative of images based on the differences between the images in accordance with one or more embodiments of the disclosure.

FIG. 10 illustrates a flow diagram for another method 1000 for generating a narrative of images based on the differences between the images. The narrative may include an arrangement or group of images selected based on common relationship or theme between the images. The narrative images may also be selected based, at least in part, on their differences to increase the amount of diversity in the narrative. For example, this may reduce the likelihood that duplicate or substantially similar images are included the in the narrative. It should be noted that in other embodiments the sequencing of the method 1000 may be altered and some operations may be omitted. In one embodiment, the content server 104 may perform the method 1000, but in other embodiments, the method 1000 may be performed by the user device 102 or a combination of the content server 104 and the user device 102.

At block 1002, the content sever 104 may identify a group of images that may be used to generate a narrative 116 or an arrangement of images that may be related to each other. The images may be captured by the user device 102 or a combination of image capturing devices. For example, a user may use several different devices to capture images, such as a phone, a tablet, one or more cameras, and/or video devices.

At block 1004, the content sever 104 may determine the differences between the images based, at least in part, on complexity, content, or color in the images. The differences may be determined as described above in the discussion of FIGS. 1-4. The differences may also include, but are not limited to, a time of image capture, a location of image capture, and the identity of people captured in the image.

In one embodiment, the differences may be categorized using histograms for each type of difference criteria. As noted above, the histograms may segregate the images based on the type or classification of the differences. For example, as shown in the location bins 222 in FIG. 4, the different types of location may be used to segregate the images. In another instance, the content server may assign a value to the items within the bins that is representative of the difference between the images in the location histogram 224. The different values may indicate the magnitude of the difference between the location bins 222. The value feature may also be applied to other difference criteria as needed.

At block 1006, the content sever 104 may arrange a portion of the images into a group of images based, at least in part, on the differences between the portion of the images. The differences may include the differences between the criterion (e.g., color, content, complexity, etc.). The arrangement may gauge the differences between one or more difference criteria to determine the arrangement of the images. Broadly, the difference criterion may be used to prevent duplicate or substantially similar images from being included in the same arrangement. In certain instance, content server 104 may assign a value that may be used to represent the magnitude of the differences between the images within the same criteria.

In another instance, the arrangement may also include differences within a single criteria and that images may be selected from the same criteria. For example, the location criteria indicates images were taken and the beach and the hotel. The content server 104 may determine there is a sufficient difference between the locations that they may both be selected from the arrangement. In certain instances, the difference between the images in the same criteria (e.g., histogram) may even be placed next to each other in the arrangement when the differences between images exceed a threshold value. The content server 104 may use the determined difference values to gauge the differences between the images to determine if the threshold value is exceeded or achieved. In one embodiment, the selection or arrangement of the image may also be based on the average difference between the images. For example, the amount of difference between the images are averaged together to determine if the average exceeds a threshold value. Therefore, images with a lower degree of difference between the images may be compensated by other images that have a higher degree of difference. In this way, the amount of difference between images may vary and may not need to exceed the same threshold value between each of the images.

Figure 11:
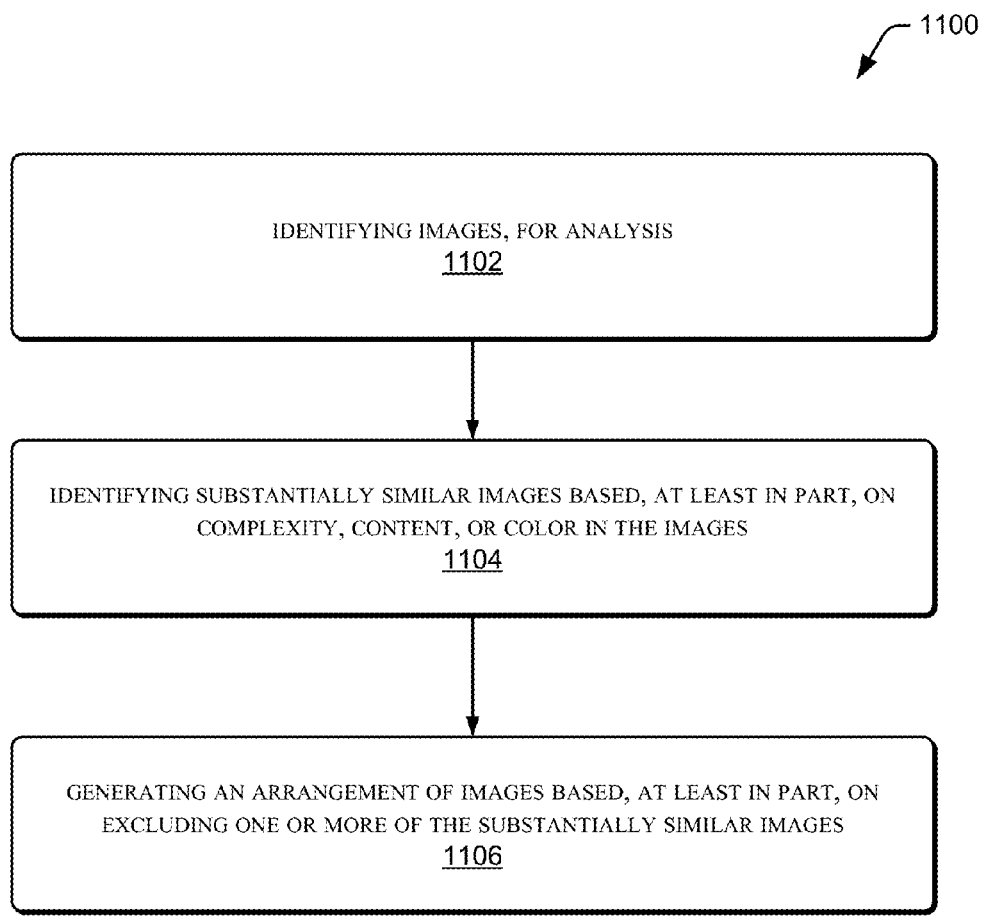
FIG. 11 illustrates a flow diagram for a method for excluding substantially similar images from being included in a narrative in accordance with one or more embodiments of the disclosure.

FIG. 11 illustrates a flow diagram for a method 1100 for excluding substantially similar images from being included in a narrative in accordance with one or more embodiments of the disclosure. It should be noted that in other embodiments the sequencing of the method 1100 may be altered and some operations may be omitted. In one embodiment, the content server 104 may perform the method 1100, but in other embodiments, the method 1100 may be performed by the user device 102 or a combination of the content server 104 and the user device 102.

At block 1102, the content server 104 may identify images for analysis for generating an arrangement of the images or a narrative that includes the images. The images may have been captured using a camera device and sent to the content server 104.

At block 1104, the content server 104 may determine, from the identified images, substantially similar images based, at least in part, on complexity, content, time, location, or color in the images. This may include identifying images that are duplicates or substantially the same based, at least in part, on the analysis described above. In one instance, the images may be determined to be substantially similar if they fall within the same bin of a histogram. In another instance, the substantially similar images may be based, at least in part, on a commonality between the images that within or is to equal to a threshold amount. For example, the values assigned to the image may be within threshold amount of each other. In one specific example, when the values are within 5% of other the image(s) the images may be deemed substantially similar to each other.

Similarity may also be based content or people within the images. In certain instances, the user may want to have variety of content or a variety of people within the arranged images. Accordingly, the content server 104 may determine that include similar content or people are substantially similar. However, in other instances, the same content or people may include other elements that make the images different enough that they may not be considered substantially similar. For example, when the same person is shown in several images at different locations or under different lighting or color conditions that the images may be deemed sufficiently different that they may not be deemed substantially similar.

At block 1106, the content server 104 may generate an arrangement of images based, at least in part, on excluding one or more of the substantially similar images from the arrangement. As noted above, the similarity may be based on the lack of differences between the images based, at least in part, on complexity, content, time, location, or color in the images.

The method 1100 may also include identifying differences in the images based, at least in part, on complexity, content, time, location, or color in the images. The arrangement may be generated further based, at least in part, on differences between the images related to the complexity, the content, time, location, or the color in the images.

Figure 12:
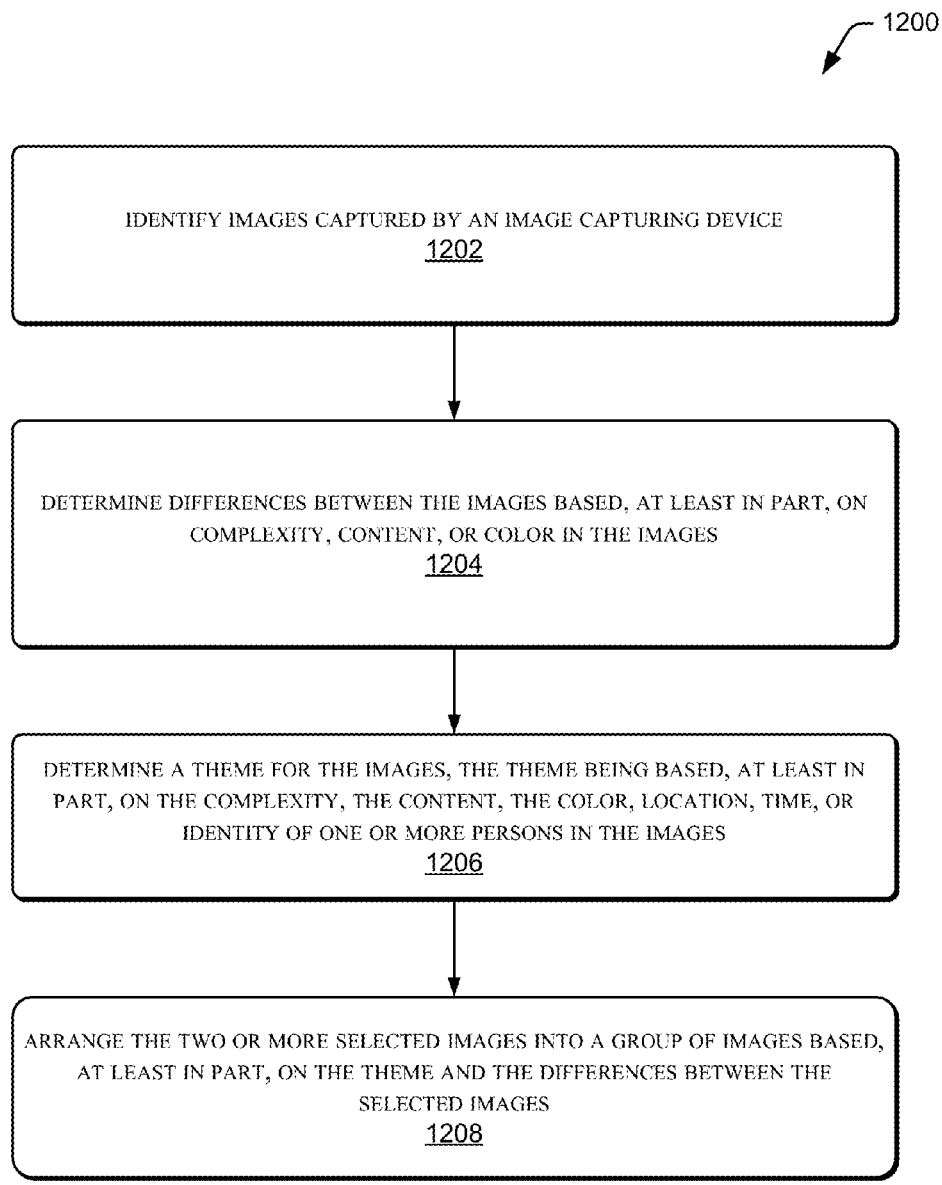
FIG. 12 illustrates a flow diagram from a method for generating a narrative based on a theme between the images and the differences between the images in accordance with one or more embodiments of the disclosure.

FIG. 12 illustrates a flow diagram from a method 1200 for generating a narrative based on a theme between the images and the differences between the images in accordance with one or more embodiments of the disclosure. The theme may be based, at least in part, on commonalities or relationships between the images. The commonalities or relationships may be based location, time, content, people, color, and/or complexity of the images. For example, multiple locations in the images may be related to each other based on the timeframe. The different locations may be related to each other when the user was on a vacation to several locations. It should be noted that in other embodiments the sequencing of the method 1200 may be altered and some operations may be omitted. In one embodiment, the content server 104 may perform the method 1200, but in other embodiments, the method 1200 may be performed by the user device 102 or a combination of the content server 104 and the user device 102.

At block 1202, the content server 104 may receive images captured by an image capturing device. The images may include information related to the content, time, or location generated by the image capture device or entered by the user. This information, along with the images, may be used to determine a theme for the images.

At block 1204, the content server 104 may determine differences between the images based, at least in part, on complexity, content, location, time, people, or color in the images. The difference determination is at least described above in the discussion of FIGS. 1-4.

At block 1206, the content server 104 may determine a theme for the images, the theme being based, at least in part, on the complexity, the content, the color, location, time, or identity of one or more persons in the images. The theme may be based, at least in part, on one or more relationships that links the images together. For example, the relationships may include, but is not limited to, a trip, an event, a locale, an entity, or a timeline. The theme may be based on a single criterion such as a trip, but may also include two or more criteria such as a trip and locale. For example, the trip may include visits to several locales. The content server 104 may generate a theme for the entire trip that includes several locales, but may also generate a theme for each of the locales separately from the trip. In certain instances, the content server may present theme concepts to the user to select which themes are preferred.

In another instance, the theme may be based, at least in part, on commonalities between the complexity, the content, the color, the location, the time, or the identity of one or more persons in the images. The theme may be generated when the commonalities between the images exceeds or is equal to a threshold amount.

At block 1210, the content server 104 may arrange the two or more selected images into a group of images based, at least in part, on the theme and the differences between the images. The arrangement may be include images that are related to the theme. Within those theme images, the content server 104 may arrange the images into a narrative that maintains a threshold amount of diversity between the images, as described above in the descriptions of FIGS. 9 and 10.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one network interface device to communication with a user device comprising an image capture device;
   at least one memory for storing computer-executable instructions; and
   at least one processor configured to execute the computer-executable instructions to: segregate images into groups based, at least in part, on differences between the images;
   select grouped images from the groups, the grouped images having a higher quality within the groups, and the higher quality being based, at least in part, on at least one aesthetic characteristic, and wherein the second grouped images includes a first image, a second image and a third image;
   determine a first difference between the first image and the second image;
   determine a second difference between the first image and the third image;
   determine a third difference between the second image and the third image, wherein at least the third difference is based, at least in part, on at least one of complexity, content, or color in the second image, and the third image;
   arrange with diversity the first image, the second image, and the third image into an arrangement having the second image placed between the first image and the third image based, at least in part, on the first difference and the third difference each being greater than the second difference; and
   share the arrangement of images using the network interface device.

2. The system of claim 1, wherein the differences between the images comprise location, time, or facial recognition.

3. The system of claim 1, wherein at least a group of the differences between the images comprise differences in subject matter between the images.

4. The system of claim 1, wherein at least a group of the differences between the images comprise one or more color palettes.

5. The system of claim 1, wherein at least a group of the differences between the images are based, at least in part, on an amount of detail within an image.

6. The system of claim 1, wherein at least a group of the differences comprise second differences in second complexity based, at least in part, on an amount of edges in an image, the edges being an indication of a change in magnintude of a characteristic of the image between two locations in the image.

7. The system of claim 1, wherein the at least one aesthetic characteristic comprises one or more of clarity, brightness, contrast, saturation, or sharpness.

8. The system of claim 1, wherein the at least one processor is further configured to execute the computer-executable instructions to alter an image of the grouped images via an adjustment of at least one property of the images, and wherein the at least one property comprises one or more of image size of the image or number of elements of the image.

9. The system of claim 1, wherein the arrangement comprises a cover image that indicates a theme of the arrangement, intermediate images selected based on their relative diversity to each other with regard to content, color, complexity, time, facial recognition, or location, and a concluding image that indicates a conclusion to the arrangement.

10. A device, comprising:
    at least one memory that stores computer-executable instructions; and
    at least one processor configured to access the at least one interface device and the at least one memory and execute the computer-executable instructions to:
    identify images stored in memory;
    determine a first difference between a first image of the images and a second image of the images;
    determine a second difference between the first image and a third image of the images;
    determine a third difference between the second image and the third image; and
    arrange with diversity the first image, and the second image, and the third image into an arrangement based, at least in part, on the first difference and the third difference each being greater than the second difference exceeding a threshold, the arrangement including the first image and the second image adjacent to or nearby each other.

11. The device of claim of claim 10, wherein the arrangement comprises an average difference between two or more images in the arrangement.

12. The device of claim 10, wherein the difference first difference comprises a complexity difference based, at least in part, on a histogram of edges within the first image, the edges being an indication of a magnitude of change in color within the image between at least two locations within the image.

13. The device of claim 10, wherein the difference first difference comprises a content difference based, at least in part, on a histogram of items captured in the first image.

14. The device of claim 10, wherein the difference first difference comprises a color difference are based, at least in part, on a histogram of color palettes captured in the first image.

15. The device of claim 10, wherein the first difference comprises a value based, at least in part, on at least one of complexity, content, or color in the first image.

16. The device of claim 10, wherein the at least one processor is further configured to execute the computer-executable instructions to:
   determine an identity of at least one person captured in the images; determine at least one location captured in one or more of the images; or
   determine a time reference for when one or more of the images was captured.

17. The device of claim 16, wherein the arrangement is further based, at least in part, on the time reference for when one or more of the images were captured, a location of where an image of the one or more images was captured, or an identity of at least one person.

18. The device of claim 16, wherein the arrangement comprises a theme image that is representative of a portion of two or more of the images that are selected based, at least in part, on complexity, content, color, location, time, or identity of at least one person.

19. The device of claim 10, wherein the computer-executable instructions to generate an arrangement includes the third image being adjacent to or nearby the first image and the second image.

20. A method comprising: identifying images stored in memory;
   determining, from the images, a first image similar to a second image based, at least in part, on at least one of complexity, content, time, location, or color in the images; determining a first difference between the first image and the second image;
   determining a second difference between the first image and a third image of the images
   determining a third difference between the second image and the third image:
   and generating an arrangement of the first image and, the second image, and the third image with diversity based, at least in part, on the first difference and the third difference each being greater than the second difference exceeding a threshold, the arrangement including the first image and the second image adjacent to or nearby each other.

21. The method of claim 20, wherein the determining, from the images, the first image similar to the second image is further based, at least in part, on an identity of one or more persons in the first image.

22. The method of claim 20, wherein the determining, from the images, the first image similar to the second image is further based, at least in part, on a commonality between the first image and the second image that exceeds or equals a second commonality threshold.

23. The method of claim 20, wherein the arrangement includes the third image being adjacent to or nearby the first image and the second image.

24. One or more non-transitory computer-readable media storing computer-executable instructions that, when executed by at least one processor, configure the at least one processor to perform operations comprising:
   receiving images captured by an image capturing device;
   determining a first difference between a first image of the images and a second image of the images;
   determining a second difference between the first image of the images and a third image of the images:
   determining a third difference between the second image and the third image;
   and determining a theme for the images, the theme being based, at least in part, on the complexity, the content, the color, location, time, or identity of one or more persons in the images; and
   arranging with diversity the first image, and the second image, and the third image into an arrangement based, at least in part, on the theme exceeding a threshold and based, at least in part, on the first difference and the third difference;
   Each being greater than the second difference, the arrangement including the first image and the second image adjacent to or nearby each other.

25. The one or more non-transitory computer-readable media of claim 24, wherein the theme is based, at least in part, on a relationship that links the images together.

26. The one or more non-transitory computer-readable media of claim 25, wherein the relationship is based, at least in part, on a trip, an event, a locale, an entity, or a timeline.

27. The one or more non-transitory computer-readable media of claim 25, wherein the relationship is based, at least in part, on commonalities between complexity, content, color, location, time, or identity of one or more persons in the images.

28. The one or more non-transitory computer-readable media of claim 27, wherein the relationship is established based, at least in part, on the commonalities between the images being greater than or equal to a commonality threshold amount.

* * * * *